US011558234B2

(12) United States Patent
Lee et al.

(10) Patent No.: US 11,558,234 B2
(45) Date of Patent: Jan. 17, 2023

(54) METHOD FOR TRANSMITTING OR RECEIVING PHASE TRACKING REFERENCE SIGNAL BETWEEN TERMINAL AND BASE STATION IN WIRELESS COMMUNICATION SYSTEM AND APPARATUS SUPPORTING SAME

(71) Applicant: LG ELECTRONICS INC., Seoul (KR)

(72) Inventors: Kilbom Lee, Seoul (KR); Jiwon Kang, Seoul (KR); Kyuseok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 84 days.

(21) Appl. No.: 16/972,981

(22) PCT Filed: May 21, 2019

(86) PCT No.: PCT/KR2019/006045
§ 371 (c)(1),
(2) Date: Dec. 7, 2020

(87) PCT Pub. No.: WO2019/235756
PCT Pub. Date: Dec. 12, 2019

(65) Prior Publication Data
US 2021/0258200 A1 Aug. 19, 2021

Related U.S. Application Data

(60) Provisional application No. 62/682,124, filed on Jun. 7, 2018.

(51) Int. Cl.
H04L 27/26 (2006.01)
H04L 5/00 (2006.01)
(Continued)

(52) U.S. Cl.
CPC ........ *H04L 27/2675* (2013.01); *H04L 5/0048* (2013.01); *H04W 72/042* (2013.01); *H04W 72/1273* (2013.01)

(58) Field of Classification Search
CPC ....... H04L 1/00; H04L 5/0048; H04L 5/0051; H04L 5/0053; H04L 27/2613; H04L 27/2675; H04W 72/042; H04W 72/1273
See application file for complete search history.

(56) References Cited

U.S. PATENT DOCUMENTS 10,419,087 B2 * 9/2019 Kim ................. H04W 72/042
10,547,485 B2 * 1/2020 Huang ............... H04L 27/2666
(Continued)

FOREIGN PATENT DOCUMENTS

CA 3062381 A1 * 11/2019 ........... H04L 1/0003
CN 108259143 A * 7/2018 ........... H04B 7/0456
(Continued)

OTHER PUBLICATIONS

PCT International Application No. PCT/KR2019/006045, International Search Report dated Sep. 17, 2019, 19 pages.
(Continued)

Primary Examiner — Eric Nowlin
(74) Attorney, Agent, or Firm — Lee Hong Degerman Kang Waimey

(57) ABSTRACT

Disclosed are a method for transmitting or receiving a phase tracking reference signal between a terminal and a base station in a wireless communication system and an apparatus supporting the method. According to one embodiment applicable to the present invention, on the basis of association between the PT-RS and greater of the two demodulation reference signal (DMRS) port indices under code division multiplexing in the time domain (CDM-T), a terminal and a base station determine a first resource for the PT-RS, and
(Continued)

transmit and receive same by means of the first resource, wherein the first resource is located on the same subcarrier as a second resource, which is for a PT-RS associated with the smaller of the two DMRS port indices under CDM-T, but on a different symbol than the second resource.

11 Claims, 30 Drawing Sheets

(51) Int. Cl.
*H04W 72/04* (2009.01)
*H04W 72/12* (2009.01)

(56) References Cited

U.S. PATENT DOCUMENTS

| | | | | |
|---|---|---|---|---|
| 10,659,119 | B2* | 5/2020 | Li | H04L 5/0048 |
| 11,258,558 | B2* | 2/2022 | Maki | H04L 5/0094 |
| 2018/0041259 | A1* | 2/2018 | Kim | H04L 5/0048 |
| 2018/0367360 | A1* | 12/2018 | Huang | H04L 27/2653 |
| 2019/0081844 | A1* | 3/2019 | Lee | H04L 27/2675 |
| 2019/0149295 | A1* | 5/2019 | Wang | H04L 5/0051 370/336 |
| 2019/0165910 | A1* | 5/2019 | Lee | H04L 5/0048 |
| 2019/0222385 | A1* | 7/2019 | Hessler | H04L 27/2655 |
| 2019/0326964 | A1* | 10/2019 | Li | H04L 27/2602 |
| 2020/0220675 | A1* | 7/2020 | Lee | H04L 5/0094 |
| 2020/0259609 | A1* | 8/2020 | Saito | H04L 27/261 |
| 2020/0374084 | A1* | 11/2020 | Yuan | H04L 1/0026 |
| 2021/0160025 | A1* | 5/2021 | Gao | H04L 5/0094 |
| 2021/0258200 | A1* | 8/2021 | Lee | H04L 1/00 |
| 2021/0385113 | A1* | 12/2021 | Sun | H04L 5/0051 |
| 2022/0109601 | A1* | 4/2022 | Zewail | H04L 27/2646 |

FOREIGN PATENT DOCUMENTS

| | | | | | |
|---|---|---|---|---|---|
| CN | 108631987 | A | * | 10/2018 | H04L 5/0023 |
| CN | 109150429 | A | * | 1/2019 | H04B 7/0456 |
| CN | 109150438 | A | * | 1/2019 | H04L 27/144 |
| CN | 109586868 | A | * | 4/2019 | H04L 25/0224 |
| CN | 109802777 | A | * | 5/2019 | H04L 5/00 |
| CN | 110663237 | A | * | 1/2020 | H04J 11/003 |
| CN | 110679109 | A | * | 1/2020 | H04L 1/0003 |
| CN | 108259143 | B | * | 2/2020 | H04B 7/0456 |
| CN | 109150429 | B | * | 10/2020 | H04B 7/0456 |
| CN | 111901086 | A | * | 11/2020 | H04L 5/0048 |
| CN | 109150438 | B | * | 12/2020 | H04L 27/144 |
| CN | 109586868 | B | * | 9/2021 | H04L 25/0224 |
| CN | 108631987 | B | * | 5/2022 | H04L 5/0023 |
| EP | 3565205 | B1 | * | 2/2021 | H04B 7/0456 |
| EP | 3711271 | B1 | * | 1/2022 | H04B 7/0452 |
| EP | 4009567 | A1 | * | 6/2022 | H04B 7/0452 |
| JP | 2020519185 | A | * | 6/2020 | |
| JP | 2021510241 | A | * | 4/2021 | |
| KR | 20180071301 | A | * | 4/2019 | |
| WO | WO-2017188591 | A1 | * | 11/2017 | H04B 7/01 |
| WO | 2018088816 | | | 5/2018 | |
| WO | WO-2018120875 | A1 | * | 7/2018 | H04B 7/0456 |
| WO | WO-2018171800 | A1 | * | 9/2018 | H04L 5/0023 |
| WO | WO-2018228153 | A1 | * | 12/2018 | H04B 7/0456 |
| WO | WO-2018230133 | A1 | * | 12/2018 | H04J 11/003 |
| WO | WO-2019235756 | A1 | * | 12/2019 | H04L 27/2675 |
| WO | WO2018230133 | A1 | * | 4/2020 | |

OTHER PUBLICATIONS

Vivo, "Remaining issues on PT-RS," 3GPP TSG-RAN WG1 Meeting #92bis, R1-1803824, Apr. 2018, 11 pages.
Zte et al., "Remaining details on DMRS," 3GPP TSG RAN WG1 Meeting AH 1801, R1-1800114, Jan. 2018, 13 pages.
Vivo, "Remaining issues on PT-RS," 3GPP TSG RAN WG1 Meeting #92, R1-1801526, Mar. 2018, 10 pages.
Spreadtrum Communications, "Remaining issues on PT-RS," 3GPP TSG RAN WG1 Meeting AH 1801, R1-1800273, Jan. 2018, 12 pages.

* cited by examiner (a)

METHOD FOR TRANSMITTING OR RECEIVING PHASE TRACKING REFERENCE SIGNAL BETWEEN TERMINAL AND BASE STATION IN WIRELESS COMMUNICATION SYSTEM AND APPARATUS SUPPORTING SAME

CROSS-REFERENCE TO RELATED APPLICATIONS

This application is the National Stage filing under 35 U.S.C. 371 of International Application No. PCT/KR2019/006045, filed on May 21, 2019, which claims the benefit of U.S. Provisional Application No. 62/682,124, filed on Jun. 7, 2018, the contents of which are incorporated by reference herein in their entirety.

TECHNICAL FIELD

The present disclosure relates to a wireless communication system and, more particularly, to a method of transmitting and receiving a phase tracking reference signal between a terminal and a base station in a wireless communication system and apparatus for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As more communication devices have demanded higher communication capacity, enhanced mobile broadband (eMBB) communication technology relative to legacy radio access technology (RAT) has been introduced. In addition, a communication system considering services/UEs sensitive to reliability and latency as well as massive machine type communication (MTC) for providing various services anytime and anywhere by connecting a plurality of devices and objects to each other has been introduced.

Thus, eMBB communication, massive MTC, ultra-reliable and low-latency communication (URLLC), etc. have been introduced. In particular, various configurations for a phase tracking reference signal (PT-RS) to estimate phase noise between a UE and base station (BS) in various frequency bands are under discussion in consideration of a signal transmission and reception method in the various frequency bands.

The present disclosure may be related to the following technical configurations.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present disclosure.

The AI device 100 may be implemented by a stationary device or a mobile device, such as a TV, a projector, a mobile phone, a smartphone, a desktop computer, a notebook, a digital broadcasting UE, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231*a*) through the learning processor 240.

The learning processor 240 may learn the artificial neural network 231*a* by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

FIG. 3 illustrates an AI system 1 according to an embodiment of the present disclosure.

Referring to FIG. 3, in the AI system 1, at least one of an AI server 200, a robot 100*a*, a self-driving vehicle 100*b*, an XR device 100*c*, a smartphone 100*d*, or a home appliance 100*e* is connected to a cloud network 10. The robot 100*a*, the self-driving vehicle 100*b*, the XR device 100*c*, the smartphone 100*d*, or the home appliance 100*e*, to which the AI technology is applied, may be referred to as AI devices 100*a* to 100*e*.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100*a* to 100*e* and 200 configuring the AI system 1 may be connected to each other through the cloud network 10. In particular, each of the devices 100*a* to 100*e* and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100*a*, the self-driving vehicle 100*b*, the XR device 100*c*, the smartphone 100*d*, or the home appliance 100*e* through the cloud network 10, and may assist at least part of AI processing of the connected AI devices 100*a* to 100*e*.

At this time, the AI server 200 may learn the artificial neural network according to the machine learning algorithm instead of the AI devices 100*a* to 100*e*, and may directly store the learning model or transmit the learning model to the AI devices 100*a* to 100*e*.

At this time, the AI server 200 may receive input data from the AI devices 100*a* to 100*e*, may infer the result value for the received input data by using the learning model, may generate a response or a control command based on the inferred result value, and may transmit the response or the control command to the AI devices 100*a* to 100*e*.

Alternatively, the AI devices 100*a* to 100*e* may infer the result value for the input data by directly using the learning model, and may generate the response or the control command based on the inference result.

Hereinafter, various embodiments of the AI devices 100*a* to 100*e* to which the above-described technology is applied will be described. The AI devices 100*a* to 100*e* illustrated in FIG. 3 may be regarded as a specific embodiment of the AI device 100 illustrated in FIG. 1.

<AI+Robot>

The robot 100*a*, to which the AI technology is applied, may be implemented as a guide robot, a carrying robot, a cleaning robot, a wearable robot, an entertainment robot, a pet robot, an unmanned flying robot, or the like.

The robot 100*a* may include a robot control module for controlling the operation, and the robot control module may refer to a software module or a chip implementing the software module by hardware.

The robot 100*a* may acquire state information about the robot 100*a* by using sensor information acquired from various kinds of sensors, may detect (recognize) surrounding environment and objects, may generate map data, may determine the route and the travel plan, may determine the response to user interaction, or may determine the operation.

The robot 100*a* may use the sensor information acquired from at least one sensor among the lidar, the radar, and the camera so as to determine the travel route and the travel plan.

The robot 100*a* may perform the above-described operations by using the learning model composed of at least one artificial neural network. For example, the robot 100*a* may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

DISCLOSURE

Technical Problem

The object of the present disclosure is to provide a method of transmitting and receiving a phase tracking reference signal between a terminal and a base station in a wireless communication system and apparatuses for supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method of transmitting and receiving a phase tracking reference signal between a terminal (user equipment) and a base station in a wireless communication system and apparatus for supporting the same.

In one aspect of the present disclosure, a method of receiving a phase tracking reference signal (PT-RS) by a user equipment (UE) in a wireless communication system is provided. The method may include: determining a first resource for the PT-RS based on that the PT-RS is associated with a higher demodulation reference signal (DMRS) port index of two DMRS port indices, wherein the two DMRS port indices are code division multiplexed in a time domain (CDM-T); and receiving the PT-RS on the first resource. The first resource may be located (i) on a same subcarrier as a second resource for the PT-RS associated with a lower DMRS port index of the two CDM-T DMRS port indices and (ii) on a different symbol from the second resource.

The position of the subcarrier on which the first resource is located may be determined based on higher layer signaling and the DMRS port index associated with the PT-RS.

For example, when the two DMRS port indices are based on DMRS configuration type 1, the combination of the two DMRS port indices may be one of {#1004, #1000}, {#1005, #1001}, {#1006,#1002}, or {#1007, #1003}. When the two DMRS port indices are based on DMRS configuration type 2, the combination of the two DMRS port indices may be one of {#1006, #1000}, {#1007,#1001}, {#1008,#1002}, {#1009,#1003}, {#1010, #1004}, or {#1011, #1005}.

In the present disclosure, the time density of the PT-RS may be 2 or 4.

In this case, the time density of the PT-RS may be determined based on a modulation and coding scheme MCS scheduled for the UE.

In the present disclosure, the relative index of the symbol on which the first resource is located with respect to the starting symbol of a PDSCH in PDSCH allocation may correspond to a time index set determined by a specific procedure. When the relative index in the allocated PDSCH is 1, the specific procedure may be performed according one of option 1, option 2, or option 3.

<Option 1>
(i) setting i=0 and $l_{ref}=0$;
(ii) based on whether any one symbol in a range from a symbol index $\max(l_{ref}+(i-1)*L_{PTRS}+1, l_{ref})$ to a symbol index $l_{ref}+i*L_{PTRS}$ overlaps with a symbol used for a DMRS;
  (ii-1) setting i=1;
  (ii-2) setting $l_{ref}$ to the symbol index of a second DMRS symbol among symbols used for the overlapping DMRS; and
  (ii-3) repeating from step (ii) as long as the symbol index $l_{ref}+i*L_{PTRS}$ is included in the allocated PDSCH;
(iii) adding a symbol index $l_{ref}+i*L_{PTRS}-X$ to the time index set for the PT-RS;
(iv) increasing i by one; and
(v) repeating from step (ii) to step (iv) as long as the symbol index $l_{ref}+i*L_{PTRS}$ is included in the allocated PDSCH.

<Option 2>
(i) setting i=0 and $l_{ref}=0$;
(ii) based on whether any one symbol in a range from a symbol index $\max(l_{ref}+(i-1)L_{PTRS}+1, l_{ref})-X$ to a symbol index $l_{ref}+i*L_{PTRS}-X$ overlaps with a symbol used for a DMRS;
  (ii-1) setting i=1;
  (ii-2) setting $l_{ref}$ to the symbol index of a second DMRS symbol among symbols used for the overlapping DMRS; and
  (ii-3) repeating from step (ii) as long as the symbol index $l_{ref}+i*L_{PTRS}-X$ is included in the allocated PDSCH;
(iii) adding the symbol index $l_{ref}+i*L_{PTRS}-X$ to the time index set for the PT-RS;
(iv) increasing i by one; and
(v) repeating from step (ii) to step (iv) as long as the symbol index $l_{ref}+i*L_{PTRS}-X$ is included in the allocated PDSCH.

<Option 3>
(i) setting i=0 and $l_{ref}=0$;
(ii) based on whether any one symbol in a range from a symbol index $\max(l_{ref}+(i-1)L_{PTRS}+1, l_{ref})-X$ to a symbol index $l_{ref}+i*L_{PTRS}-X$ overlaps with a symbol used for a DMRS;
  (ii-1) setting i=1;
  (ii-2) setting $l_{ref}$ to the symbol index of a second DMRS symbol among symbols used for the overlapping DMRS; and
  (ii-3) repeating from step (ii) as long as a symbol index $l_{ref}+i*L_{PTRS}$ is included in the allocated PDSCH;
(iii) adding the symbol index $l_{ref}+i*L_{PTRS}-X$ to the time index set for the PT-RS;
(iv) increasing i by one; and
(v) repeating from step (ii) to step (iv) as long as the symbol index $l_{ref}+i*L_{PTRS}$ is included in the allocated PDSCH.

In the above options, Lpms may correspond to the time density of the PT-RS, and X may correspond to an offset for the PT-RS.

The offset X may be determined based on at least one of higher layer signaling, the time density of the PT-RS, or the DMRS port index associated with the PT-RS.

For example, when the offset X is zero or a non-zero integer Y, Y increases as the time density of the PT-RS increases.

In another aspect of the present disclosure, a UE for receiving a PT-RS in a wireless communication system is provided. The UE may include: at least one radio frequency (RF) module; at least one processor; and at least one memory operably connected to the at least one processor and configured to store instructions executable by the at least one processor to perform operations comprising: determining a first resource for the PT-RS based on that the PT-RS is associated with a higher DMRS port index of two CDM-T DMRS port indices; and controlling the at least one RF module to receive the PT-RS on the first resource. The first resource may be located (i) on a same subcarrier as a second resource for the PT-RS associated with a lower DMRS port index of the two CDM-T DMRS port indices and (ii) on a different symbol from the second resource.

The UE may communicate with at least one of a mobile terminal, a network, or an autonomous driving vehicle except a vehicle including the UE.

In a further aspect of the present disclosure, a base station for transmitting a PT-RS in a wireless communication system is provided. The base station may include: at least one RF module; at least one processor; and at least one memory operably connected to the at least one processor and configured to store instructions executable by the at least one processor to perform operations comprising: generating the PT-RS; mapping the PT-RS to a first resource based on that the PT-RS is associated with a higher DMRS port index of two CDM-T DMRS port indices; and controlling the at least one RF module to transmit the PT-RS to a UE on the first resource. The first resource may be located (i) on a same subcarrier as a second resource for the PT-RS associated with a lower DMRS port index of the two CDM-T DMRS port indices and (ii) on a different symbol from the second resource.

It will be understood by those skilled in the art that the above-described aspects of the present disclosure are merely part of the embodiments of the present disclosure and various modifications and alternatives could be developed from the following technical features of the present disclosure.

Advantageous Effects

As is apparent from the above description, the embodiments of the present disclosure have the following effects.

According to Rel-15 new radio (NR), when a phase tracking reference signal (PT-RS) is configured for a physical downlink shared channel (PDSCH), code division multiplexing in the time domain (CDM-T) is restricted between demodulation reference signals (DMRSs) for the PDSCH. However, considering the flexibility of signal transmission and reception, it is not desirable to restrict the CDM-T between DMRSs when the PT-RS is configured.

Accordingly, the present disclosure proposes a method of transmitting and receiving PT-RSs corresponding to DMRSs code division multiplexed in the time domain (CDM-T) based on the fact that even though the PT-RS is configured, the CDM-T between DMRSs is allowed if predetermined conditions are satisfied.

According to the present disclosure, it is possible not only to maintain the same flexibility in determining the frequency location of a channel state information reference signal (CSI-RS) as in the prior art but also to transmit and receive a PT-RS corresponding to an additional DMRS.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

FIG. 15 is a diagram schematically illustrating a configuration in which downlink signals are transmitted when a PT-RS time density is 2.

FIGS. 16 to 25 are diagrams schematically illustrating examples of PT-RS resource locations applicable to the present disclosure.

BEST MODE

Figure 1:
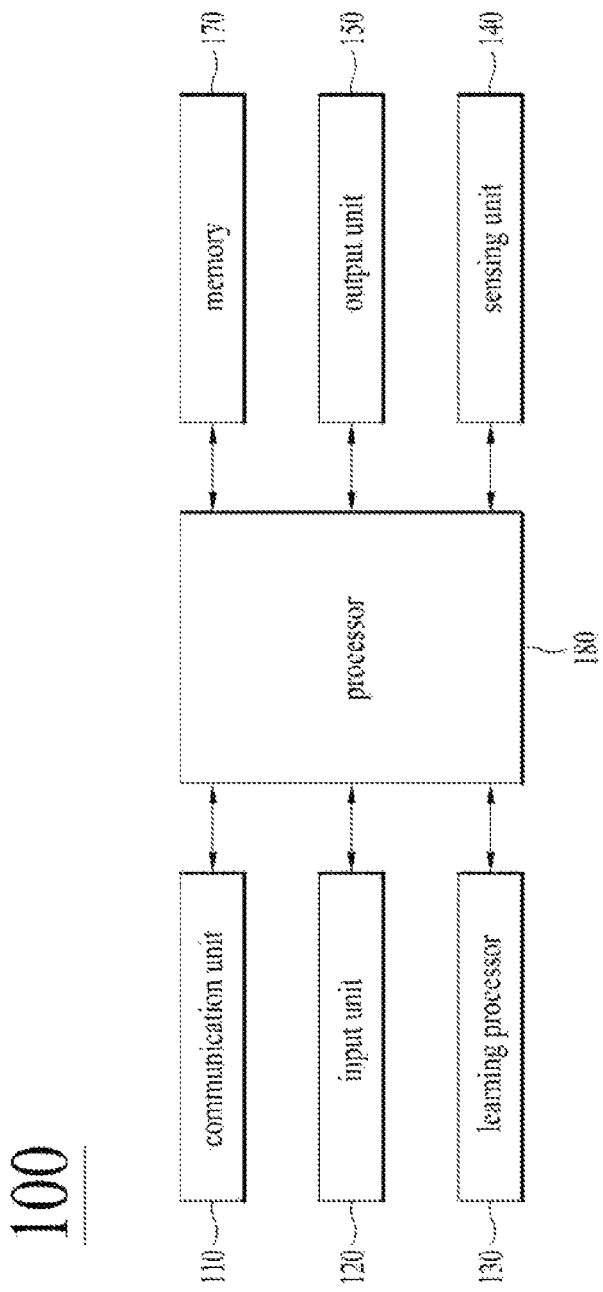
FIG. 1 illustrates an AI device according to an embodiment of the present disclosure.
Figure 2:
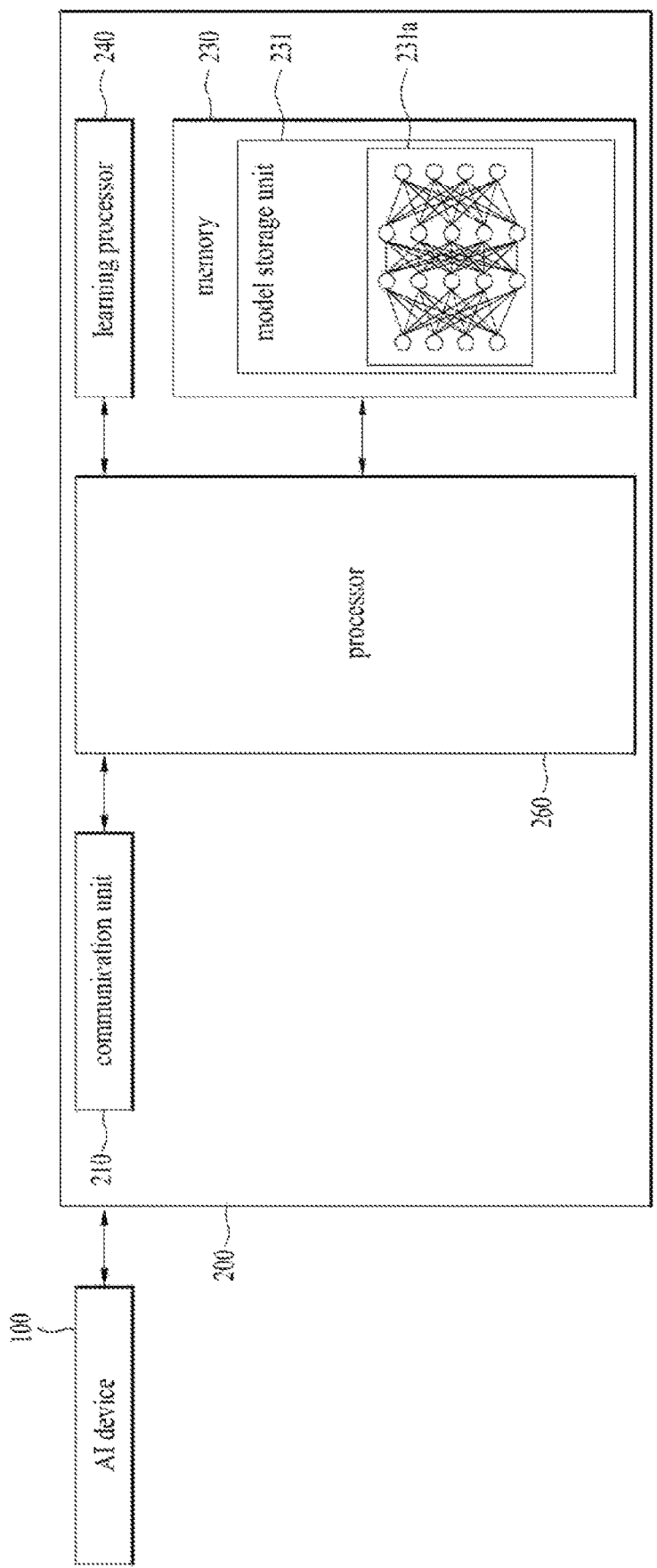
FIG. 2 illustrates an AI server according to an embodiment of the present disclosure.
Figure 3:
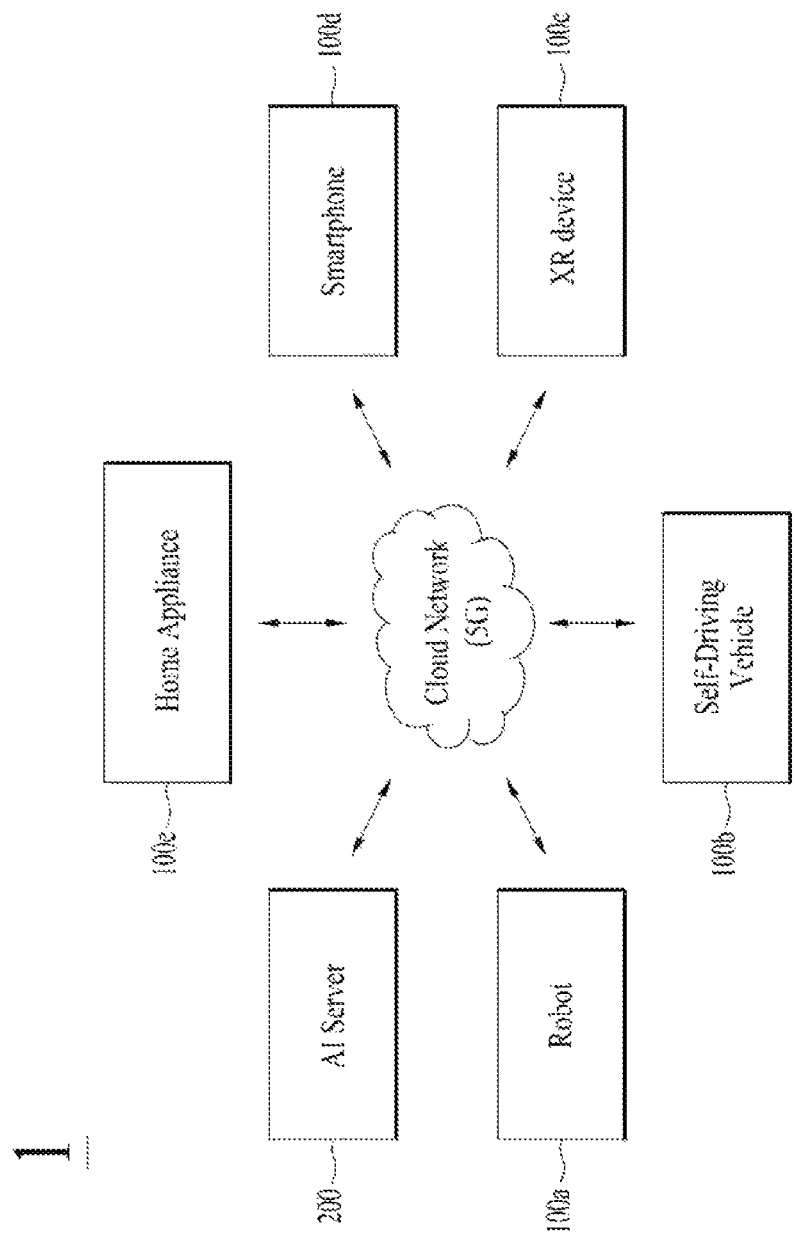
FIG. 3 illustrates an AI system according to an embodiment of the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a UE node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the embodiments of the present disclosure, the term UE may be replaced with a UE, a Mobile Station (MS), a Subscriber Station (SS), a Mobile Subscriber Station (MSS), a mobile UE, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system and a 3GPP2 system. In particular, the embodiments of the present disclosure may be supported by the standard specifications, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP NR system is explained, which are examples of wireless access systems.

Technology described below may be applied to various wireless access systems such as code division multiple access (CDMA), frequency division multiple access (FDMA), time division multiple access (TDMA), orthogonal frequency division multiple access (OFDMA), and single carrier frequency division multiple access (SC-FDMA).

To clarify technical features of the present disclosure, embodiments of the present disclosure are described focusing upon a 3GPP NR system. However, the embodiments proposed in the present disclosure may be equally applied to other wireless systems (e.g., 3GPP LTE, IEEE 802.16, and IEEE 802.11).

1. NR System 1.1. Physical Channels and General Signal Transmission

In a wireless access system, a UE receives information from a base station on a DL and transmits information to the base station on a UL. The information transmitted and received between the UE and the base station includes general data information and various types of control information. There are many physical channels according to the types/usages of information transmitted and received between the base station and the UE.

Figure 4:
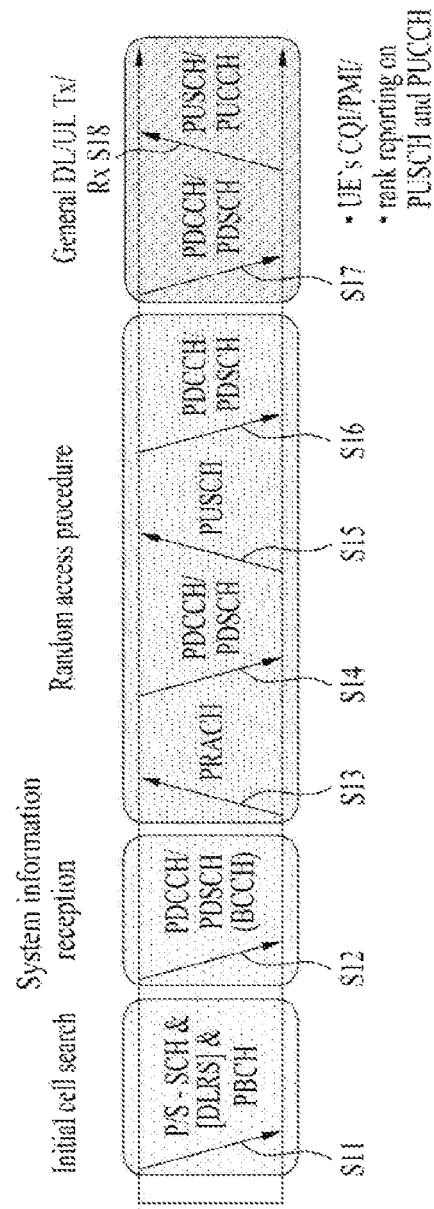
FIG. 4 is a diagram illustrating physical channels and a general signal transmission method using the physical channels.

FIG. 4 illustrates physical channels and a general signal transmission method using the physical channels, which may be used in embodiments of the present disclosure.

A UE performs initial cell search such as synchronization establishment with a BS in step S11 when the UE is powered on or enters a new cell. To this end, the UE may receive a primary synchronization channel (P-SCH) and a secondary synchronization channel (S-SCH) from the BS, establish synchronization with the BS, and acquire information such as a cell identity (ID).

Thereafter, the UE may receive a physical broadcast channel (PBCH) from the BS to acquire broadcast information in the cell.

Meanwhile, the UE may receive a DL reference signal (RS) in the initial cell search step to confirm a DL channel state.

Upon completion of initial cell search, the UE may receive a physical downlink control channel (PDCCH) and a physical downlink shared channel (PDSCH) according to information included in the PDCCH to acquire more detailed system information in step S12.

Next, the UE may perform a random access procedure such as steps S13 to S16 to complete access to the BS. To this end, the UE may transmit a preamble through a physical random access channel (PRACH) (S13) and receive a random access response (RAR) to the preamble through the PDCCH and the PDSCH corresponding to the PDCCH (S14). The UE may transmit a physical uplink shared channel (PUSCH). In the case of contention-based random access, a contention resolution procedure including transmission of a PRACH signal (S15) and reception of a PDCCH signal and a PDSCH signal corresponding to the PDCCH signal (S16) may be additionally performed.

The UE which has performed the above procedures may receive a PDCCH signal and/or a PDSCH signal (S17) and transmit a PUSCH signal and/or a physical uplink control channel (PUCCH) signal (S18) as a general UL/DL signal transmission procedure.

Control information that the UE transmits to the BS is referred to as uplink control information (UCI). The UCI includes a hybrid automatic repeat and request (HARQ) acknowledgement (ACK)/negative ACK (NACK) signal, a scheduling request (SR), a channel quality indicator (CQI), a precoding matrix index (PMI), a rank indicator (RI), or beam indication (BI) information.

In an NR system, the UCI is generally periodically transmitted on the PUCCH. However, according to an embodiment (if control information and traffic data should be transmitted simultaneously), the control information and traffic data may be transmitted on the PUSCH. In addition, the UCI may be transmitted aperiodically on the PUSCH, upon receipt of a request/command from a network.

1.2. Radio Frame Structure

Figure 5:
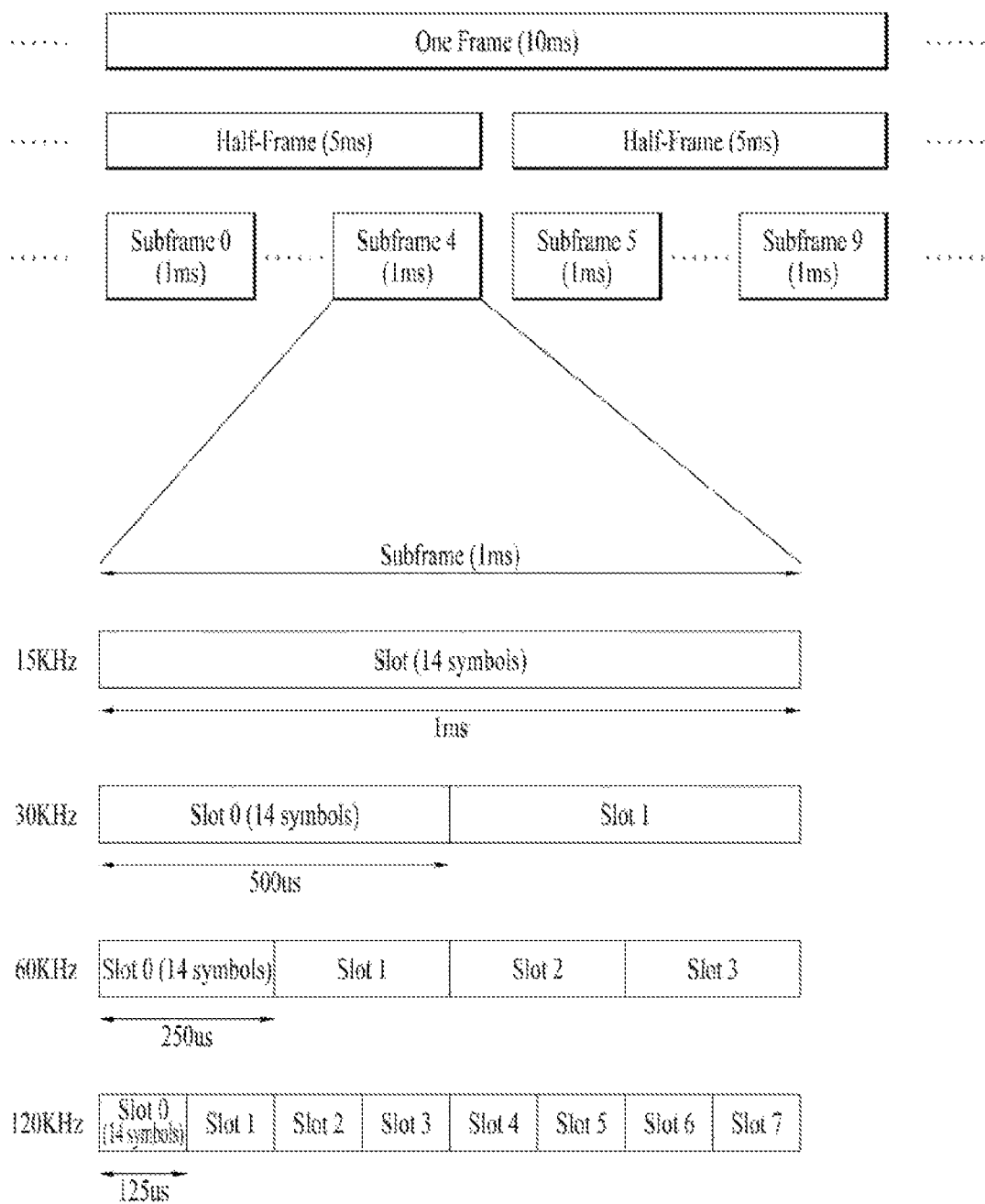
FIG. 5 is a diagram illustrating a radio frame structure in an NR system to which embodiments of the present disclosure are applicable.

FIG. 5 is a diagram illustrating a radio frame structure in an NR system to which embodiments of the present disclosure are applicable.

In the NR system, UL and DL transmissions are based on a frame as illustrated in FIG. 5. One radio frame is 10 ms in duration, defined by two 5-ms half-frames. One half-frame is defined by five 1-ms subframes. One subframe is divided into one or more slots, and the number of slots in a subframe depends on an SCS. Each slot includes 12 or 14 OFDM(A) symbols according to a CP. Each slot includes 14 symbols in a normal CP case, and 12 symbols in an extended CP case. Herein, a symbol may include an OFDM symbol (or a CP-OFDM) symbol and an SC-FDMA symbol (or a DFT-s-OFDM symbol).

Table 1 lists the number of symbols per slot, the number of slots per frame, and the number of slots per subframe in the normal CP case, and Table 2 lists the number of symbols per slot, the number of slots per frame, and the number of slots per subframe in the extended CP case.

TABLE 1

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2

| μ | $N_{symb}^{slot}$ | $N_{slot}^{frame, \mu}$ | $N_{slot}^{subframe, \mu}$ |
|---|---|---|---|
| 2 | 12 | 40 | 4 |

In the above tables, Nslotsymb represents the number of symbols in a slot, Nframe,μslot represents the number of slots in a frame, and Nsubframe,μslot represents the number of slots in a subframe.

In the NR system to which the present disclosure is applicable, different OFDM(A) numerologies (e.g., SCSs, CP length, and so on) may be configured for a plurality of cells aggregated for a UE. Therefore, the (absolute) duration of a time resource (e.g., an SF, slot, or TTI) (for the convenience of description, generically referred to as a time unit (TU)) including the same number of symbols may be different between the aggregated cells.

Figure 6:
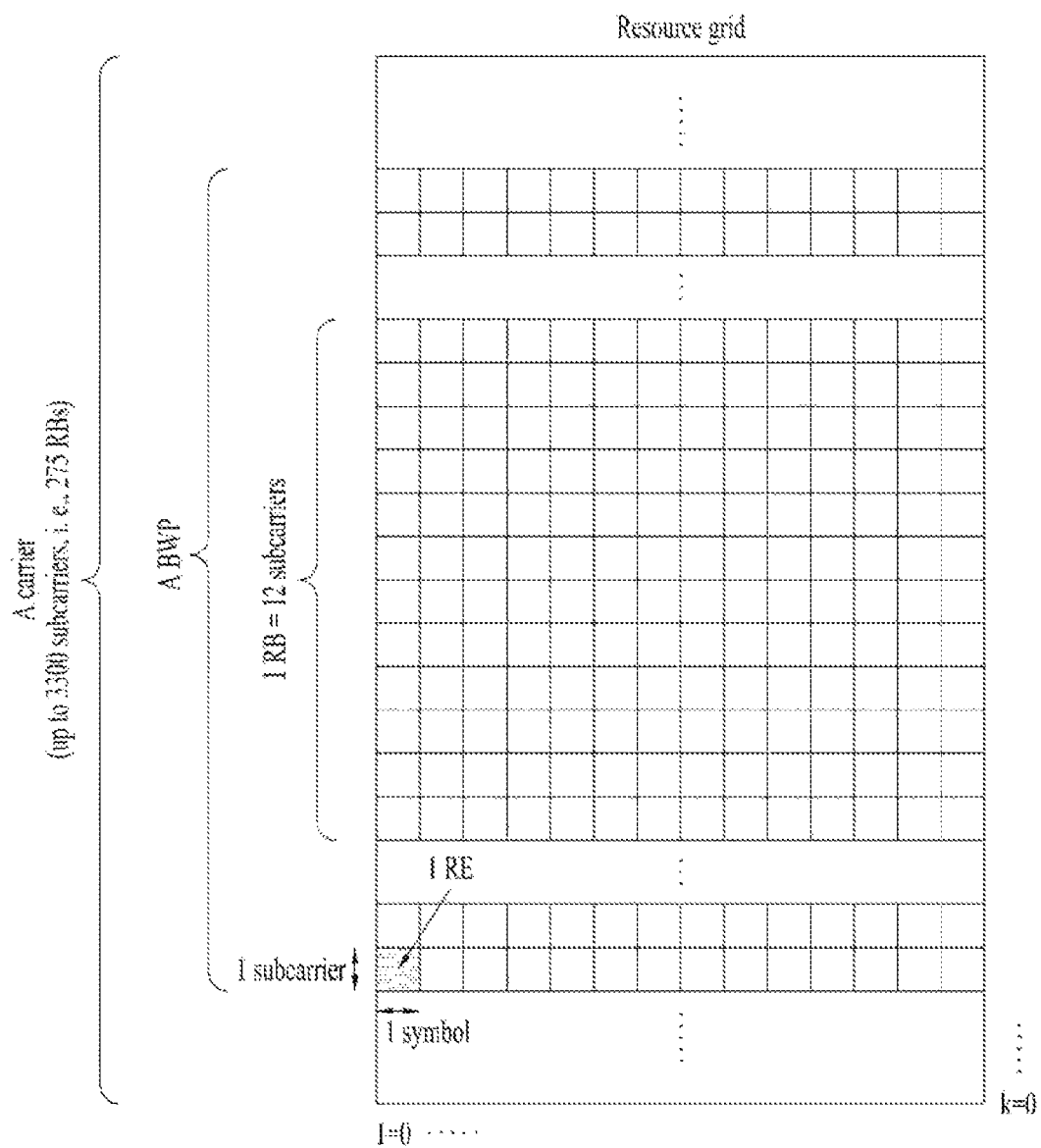
FIG. 6 is a diagram illustrating a slot structure in an NR system to which embodiments of the present disclosure are applicable.

FIG. 6 is a diagram illustrating a slot structure in an NR system to which embodiments of the present disclosure are applicable.

One slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A bandwidth part (BWP), which is defined by a plurality of consecutive (P)RBs in the frequency domain, may correspond to one numerology (e.g., SCS, CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 7:
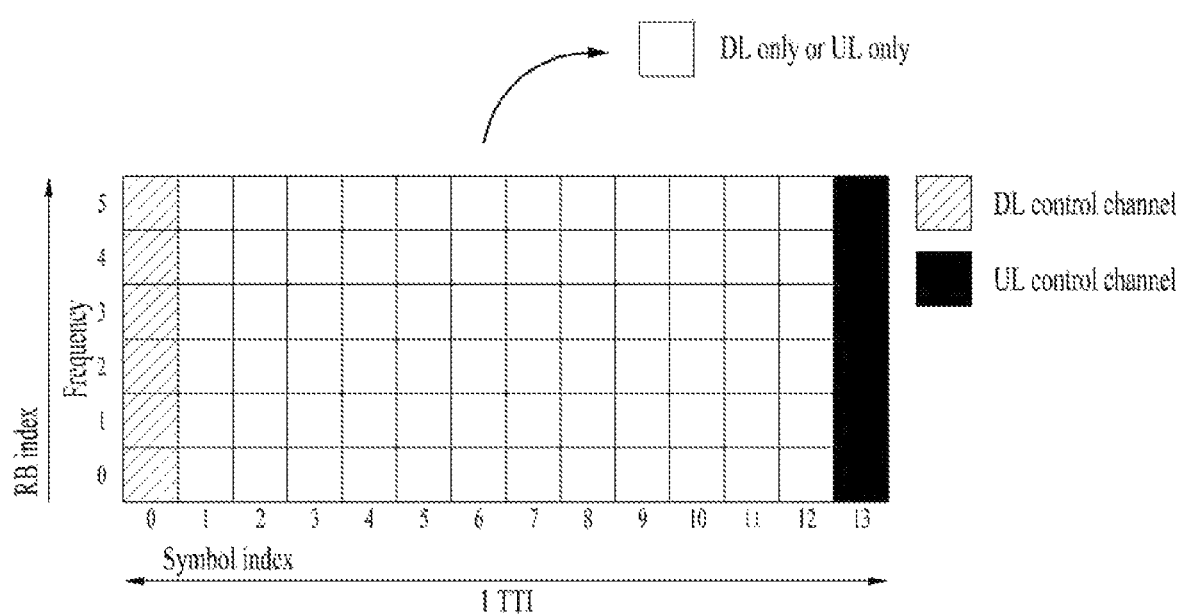
FIG. 7 is a diagram illustrating a self-contained slot structure in an NR system to which embodiments of the present disclosure are applicable.

FIG. 7 is a diagram illustrating a self-contained slot structures in an NR system to which embodiments of the present disclosure are applicable.

In FIG. 7, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, a base station and a UE may sequentially perform DL transmission and UL transmission in one slot. That is, the base station and UE may transmit and receive not only DL data but also a UL ACK/NACK for the DL data in one slot. Consequently, this structure may reduce a time required until data retransmission when a data transmission error occurs, thereby minimizing the latency of a final data transmission.

In this self-contained slot structure, a predetermined length of time gap is required to allow the base station and UE to switch from transmission mode to reception mode and vice versa. To this end, in the self-contained slot structure, some OFDM symbols at the time of switching from DL to UL may be configured as a guard period (GP).

Figure 8:
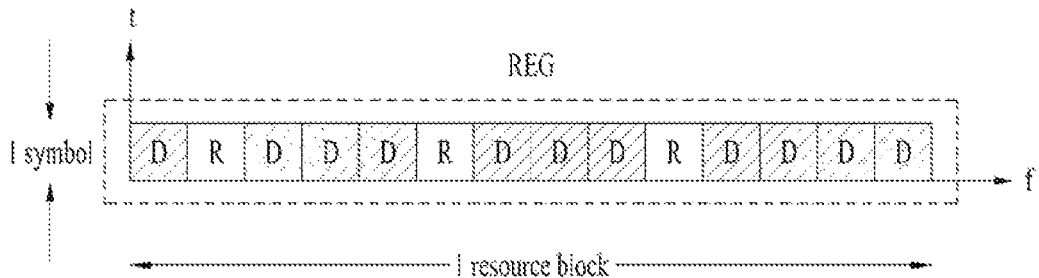
FIG. 8 is a diagram illustrating the structure of one REG in an NR system to which embodiments of the present disclosure are applicable.

Although it has been described above that the self-contained slot structure includes both DL and UL control regions, these control regions may be selectively included in the self-contained slot structure. In other words, the self-contained slot structure according to the present disclosure may include either the DL control region or the UL control region as well as both the DL and UL control regions as illustrated in FIG. 8.

Further, the order of the regions in one slot may vary according to embodiments. For example, one slot may be configured in the order of DL control region, DL data region, UL control region, and UL data region, or UL control region, UL data region, DL control region, and DL data region.

A PDCCH may be transmitted in the DL control region, and a PDSCH may be transmitted in the DL data region. A PUCCH may be transmitted in the UL control region, and a PUSCH may be transmitted in the UL data region.

The PDCCH may deliver downlink control information (DCI), for example, DL data scheduling information, UL data scheduling information, and so on. The PUCCH may deliver uplink control information (UCI), for example, an ACK/NACK for DL data, channel state information (CSI), a scheduling request (SR), and so on.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

The PDCCH carries DCI and uses QPSK as a modulation scheme. One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

FIG. 8 is a diagram illustrating the structure of one REG in an NR system to which embodiments of the present disclosure are applicable.

In FIG. 8, D represents an RE to which DCI is mapped, and R represents an RE to which a DMRS is mapped. The DMRS is mapped to REs #1, #5, and #9 along the frequency axis in one symbol.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSC in the CP-OFDM or DFT-s-OFDM waveform. A PUSCH transmission may be dynamically scheduled by a UL grant in DCI, or semi-statically scheduled by higher-layer (e.g., RRC) signaling (and/or layer 1 (L1) signaling such as a PDCCH) (configured grant). The PUSCH transmission may be performed in a codebook-based or non-codebook-based manner.

The PUCCH delivers UCI, an HARQ-ACK, and/or an SR and is classified as a short PUCCH or a long PUCCH according to the transmission duration of the PUCCH. Table 3 lists exemplary PUCCH formats.

located in symbols #1, #4, #7, and #10 of a given RB with a density of ⅓. A pseudo noise (PN) sequence is used for a DMRS sequence. For 1-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 includes an OCC. Modulation symbols are transmitted in TDM with the DMRS.

1.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

TABLE 3

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the base station by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 9:
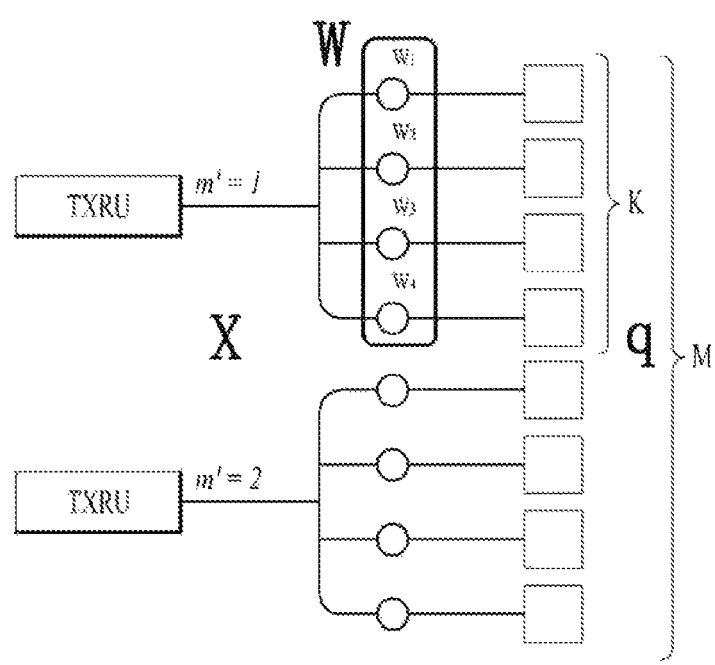
FIGS. 9 and 10 are diagrams illustrating representative methods for connecting TXRUs to antenna elements.
Figure 10:
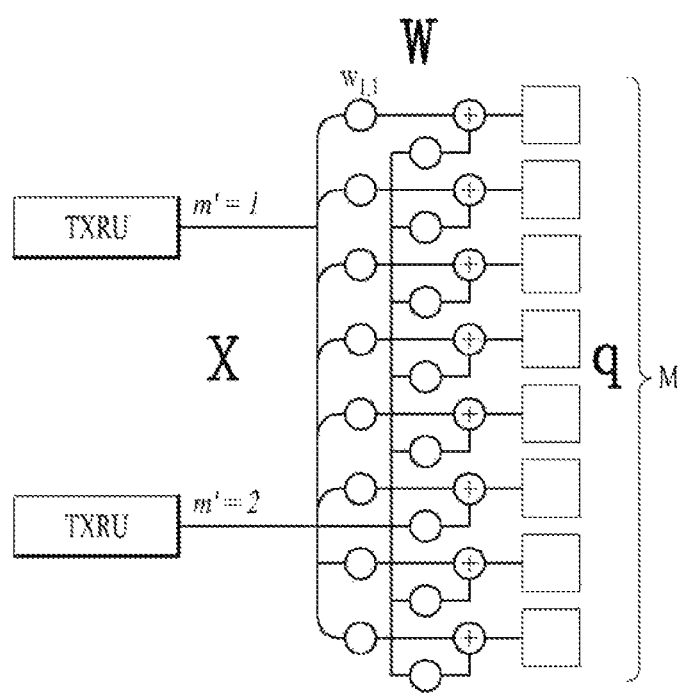

FIGS. 9 and 10 are diagrams illustrating representative methods for connecting TXRUs to antenna elements. Here, the TXRU virtualization model represents the relationship between TXRU output signals and antenna element output signals.

FIG. 9 shows a method for connecting TXRUs to subarrays. In FIG. 9, one antenna element is connected to one TXRU.

Meanwhile, FIG. 10 shows a method for connecting all TXRUs to all antenna elements. In FIG. 10, all antenna elements are connected to all TXRUs. In this case, separate addition units are required to connect all antenna elements to all TXRUs as shown in FIG. 10.

In FIGS. 9 and 10, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 9 has a disadvantage in that it is difficult to achieve beamforming focusing but has an advantage in that all antennas can be configured at low cost.

On the contrary, the configuration shown in FIG. 10 is advantageous in that beamforming focusing can be easily achieved. However, since all antenna elements are connected to the TXRU, it has a disadvantage of high cost.

When a plurality of antennas is used in the NR system to which the present disclosure is applicable, a hybrid beamforming (BF) scheme in which digital BF and analog BF are combined may be applied. In this case, analog BF (or radio frequency (RF) BF) means an operation of performing precoding (or combining) at an RF stage. In hybrid BF, each of a baseband stage and the RF stage perform precoding (or combining) and, therefore, performance approximating to digital BF can be achieved while reducing the number of RF chains and the number of a digital-to-analog (D/A) (or analog-to-digital (A/D) converters.

For convenience of description, a hybrid BF structure may be represented by N transceiver units (TXRUs) and M physical antennas. In this case, digital BF for L data layers to be transmitted by a transmission end may be represented by an N-by-L matrix. N converted digital signals obtained thereafter are converted into analog signals via the TXRUs and then subjected to analog BF, which is represented by an M-by-N matrix.

Figure 11:
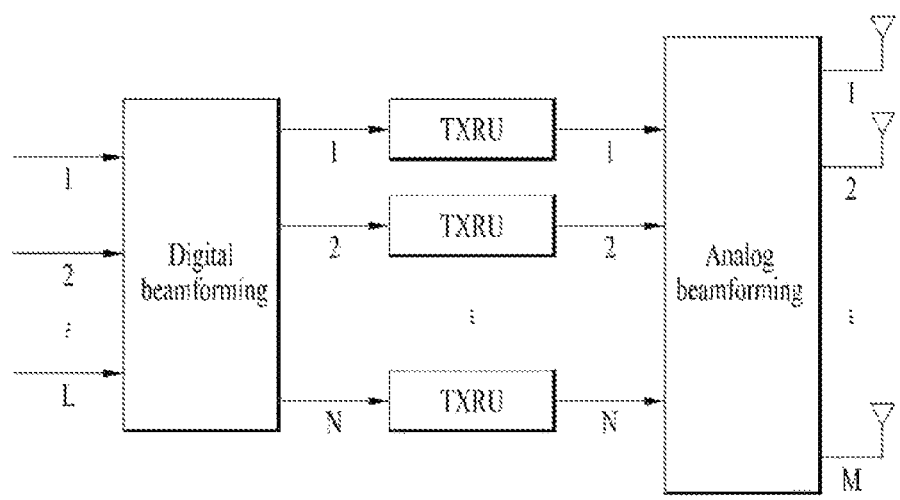
FIG. 11 is a diagram schematically illustrating an exemplary hybrid BF structure from the perspective of TXRUs and physical antennas according to the present disclosure.

FIG. 11 is a diagram schematically illustrating an exemplary hybrid BF structure from the perspective of TXRUs and physical antennas according to the present disclosure. In FIG. 11, the number of digital beams is L and the number analog beams is N.

Additionally, in the NR system to which the present disclosure is applicable, a BS designs analog BF to be changed in units of symbols to provide more efficient BF support to a UE located in a specific area. Furthermore, as illustrated in FIG. 11, when N specific TXRUs and M RF antennas are defined as one antenna panel, the NR system according to the present disclosure considers introducing a plurality of antenna panels to which independent hybrid BF is applicable.

In the case in which the BS utilizes a plurality of analog beams as described above, the analog beams advantageous for signal reception may differ according to a UE. Therefore, in the NR system to which the present disclosure is applicable, a beam sweeping operation is being considered in which the BS transmits signals (at least synchronization signals, system information, paging, and the like) by applying different analog beams in a specific subframe (SF) or slot on a symbol-by-symbol basis so that all UEs may have reception opportunities.

Figure 12:
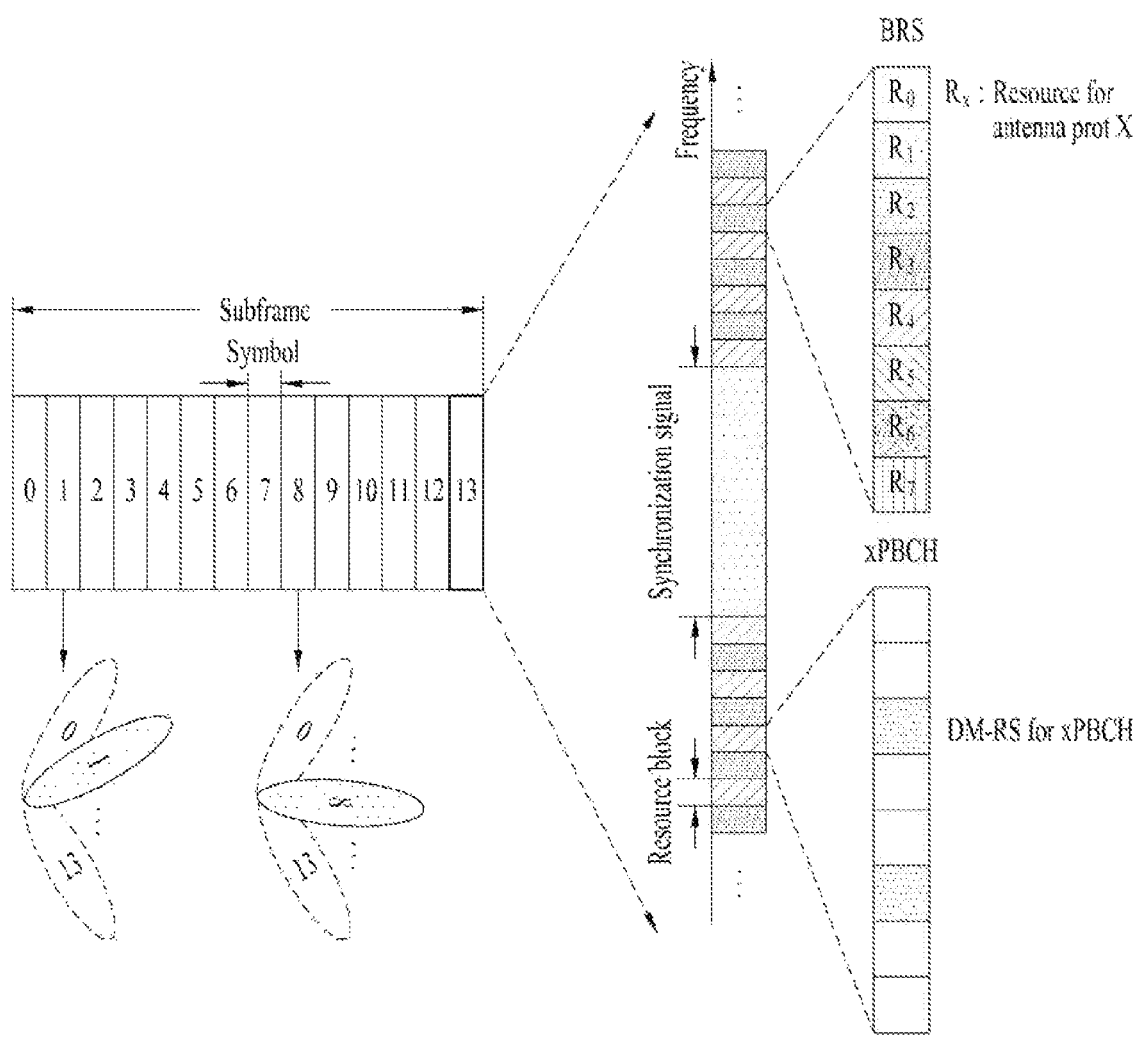
FIG. 12 is a diagram schematically illustrating an exemplary beam sweeping operation for a synchronization signal and system information in a DL transmission procedure according to the present disclosure.

FIG. 12 is a diagram schematically illustrating an exemplary beam sweeping operation for a synchronization signal and system information in a DL transmission procedure according to the present disclosure.

In FIG. 12 below, a physical resource (or physical channel) on which the system information of the NR system to which the present disclosure is applicable is transmitted in a broadcasting manner is referred to as an xPBCH. Here, analog beams belonging to different antenna panels within one symbol may be simultaneously transmitted.

As illustrated in FIG. 12, in order to measure a channel for each analog beam in the NR system to which the present disclosure is applicable, introducing a beam RS (BRS), which is a reference signal (RS) transmitted by applying a single analog beam (corresponding to a specific antenna panel), is being discussed. The BRS may be defined for a plurality of antenna ports and each antenna port of the BRS may correspond to a single analog beam. In this case, unlike the BRS, a synchronization signal or the xPBCH may be transmitted by applying all analog beams in an analog beam group such that any UE may receive the signal well.

1.4. Demodulation Reference Signal (DMRS)

In the NR system to which the present disclosure is applicable, a DMRS may be transmitted and received in a front-loaded structure. Alternatively, an additional DMRS may be transmitted and received in addition to the front-loaded DMRS.

The front-loaded DMRS may support fast decoding. The first OFDM symbol in which the front-loaded DMRS is carried may be determined as the third (e.g., 1=2) or fourth (e.g., 1=3) OFDM symbol. The first OFDM symbol position may be indicated by a PBCH.

The number of OFDM symbols in which the front-loaded DMRS is occupied may be indicated by a combination of DCI and radio resource control (RRC) signaling.

The additional DMRS may be configured for a high-speed UE. The additional DMRS may be positioned in the middle/last symbol(s) in a slot. If one front-loaded DMRS is configured, the additional DMRS may be allocated to 0 to 3 OFDM symbols. If two front-loaded DMRS symbols are configured, the additional DMRS may be allocated to 0 to 2 OFDM symbols.

The front-loaded DMRS may be divided into two types and one of the two types may be indicated through higher layer signaling (e.g., RRC signaling).

In the present disclosure, two DMRS configuration types may be applied. A DMRS configuration type which is substantially configured for the UE among the two DMRS configuration types may be indicated by higher layer signaling (e.g., RRC signaling).

DMRS configuration type 1 may be classified as follows according to the number of OFDM symbols to which the front-loaded DMRS is allocated.

DMRS Configuration Type 1 and Number of OFDM Symbols to which the Front-Loaded DMRS is Allocated=1

Up to 4 ports (e.g., P0 to P3) may be multiplexed based on length-2 frequency code division multiplexing (F-CDM) and frequency division multiplexing (FDM) schemes. RS density may be set to 6 REs per port in a resource block (RB).

DMRS Configuration Type 1 and Number of OFDM Symbols to which the Front-Loaded DMRS is Allocated=2

Up to 8 ports (e.g., P0 to P7) may be multiplexed based on length-2 F-CDM, length-2 time CDM (T-CDM), and FDM schemes. If presence of a PT-RS is configured by higher layer signaling, T-CDM may be fixed to [1 1]. RS density may be set to 12 REs per port in the RB.

DMRS configuration type 2 may be classified as follows according to the number of OFDM symbols to which the front-loaded DMRS is allocated.

DMRS Configuration Type 2 and Number of OFDM Symbols to which the Front-Loaded DMRS is Allocated=1

Up to 6 ports (e.g., P0 to P5) may be multiplexed based on length-2 F-CDM and FDM schemes. RS density may be set to 4 REs per port in the RB.

DMRS Configuration Type 2 and Number of OFDM Symbols to which the Front-Loaded DMRS is Allocated=2

Up to 12 ports (e.g., P0 to P11) may be multiplexed based on length-2 F-CDM, length-2 T-CDM, and FDM schemes. If presence of the PT-RS is configured by higher layer signaling, T-CDM may be fixed to [1 1]. RS density may be set to 8 REs per port in the RB.

Figure 13:
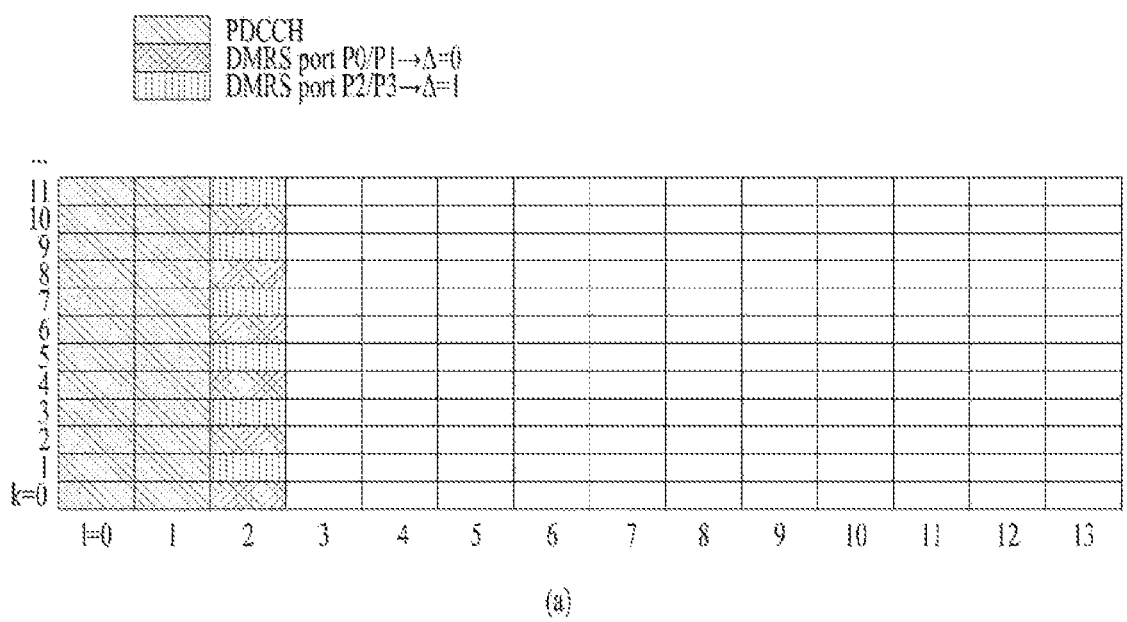
FIG. 13 is a diagram schematically illustrating an example of a front loaded DMRS of a first DMRS configuration type applicable to the present disclosure.
Figure 13:
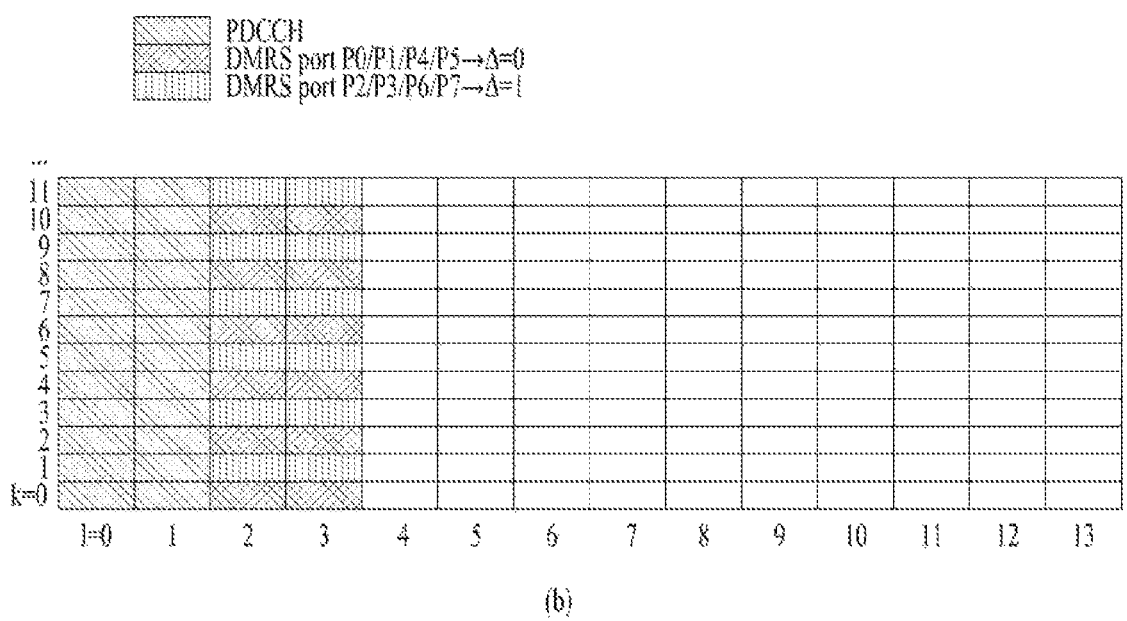

FIG. 13 is a diagram schematically illustrating an example of a front loaded DMRS of a first DMRS configuration type applicable to the present disclosure.

More specifically, FIG. 13(a) illustrates a front-loaded DMRS with one symbol and FIG. 13(b) illustrates a front-loaded DMRS with two symbols.

In FIG. 13, Δ represents a DMRS offset value on the frequency axis. In this case, DMRS ports having the same DMRS offset Δ may be subjected to code division multiplexing in the frequency domain (CDM-F) or code division multiplexing in the time domain (CDM-T). In addition, DMRS ports having different DMRS offsets Δ may be subjected to CDM-F.

The UE may obtain DMRS port configuration information configured by the BS from DCI.

In this case, the UE may receive the DMRS as follows according to the following conditions.

In DMRS configuration type 1,
If one codeword is scheduled to the UE and DCI indicating one of {2, 9, 10, 11, 30} is allocated to the UE as an index value related to antenna port mapping, or
If two codewords are scheduled to the UE,
The UE may receive the DMRS on the assumption that all other orthogonal antenna ports are not associated with PDSCH transmission to other UEs.

In DMRS configuration type 2,
If one codeword is scheduled to the UE and DCI indicating one of {2, 10, 23} is allocated to the UE as an index value related to antenna port mapping, or
If two codewords are scheduled to the UE,
The UE may receive the DMRS on the assumption that all other orthogonal antenna ports are not associated with PDSCH transmission to other UEs.

1.5. PT-RS (Phase Tracking Reference Signal)

Hereinafter, phase noise will be described. Jitter, which occurs in the time domain, may act as phase noise in the frequency domain. Such phase noise randomly changes the phase of a received signal in the time domain as shown in Equation 1 below.

$$r_n = s_n e^{j\phi_n} \text{ where}$$ [Equation 1]

$$s_n = \sum_{k=0}^{N-1} d_k e^{j2\pi \frac{kn}{N}}$$

In Equation 1, the parameters $r_n$, $s_n$, $d_k$, and $\phi_n$ denote a received signal, a time-domain signal, a frequency-domain signal, and a phase rotation value due to phase noise, respectively. Equation 2 is obtained by applying a discrete Fourier transform (DFT) process to the received signal of Equation 1.

$$y_k = d_k \frac{1}{N}\sum_{n=0}^{N-1} e^{j\phi_n} + \frac{1}{N}\sum_{\substack{t=0 \\ t \neq k}}^{N-1} d_t \sum_{n=0}^{N-1} e^{j\phi_n} e^{j2\pi(t-k)m/N}$$ [Equation 2]

In Equation 2, the parameters $$\frac{1}{N}\sum_{n=0}^{N-1} e^{j\phi_n}, \frac{1}{N}\sum_{\substack{t=0 \\ t \neq k}}^{N-1} d_t \sum_{n=0}^{N-1} e^{j\phi_n} e^{j2\pi(t-k)m/N}$$

denote common phase error (CPE) and inter-cell interference (ICI), respectively. In this case, as phase noise correlation increases, the value of the CPE of Equation 2 increases. The CPE is a kind of carrier frequency offset (CFO) in a WLAN system, but the UE may consider the CPE and CFO to be similar to each other in view of the phase noise.

The UE may eliminate the CPE/CFO, which is the phase noise in the frequency domain, by performing CPE/CFO estimation. To correctly decode a received signal, the UE may need to perform the CPE/CFO estimation before decoding the received signal. Accordingly, the BS may transmit a predetermined signal to the UE to allow the UE to perform the CPE/CFO estimation accurately. That is, the main purpose of such a signal is to estimate the phase noise. The signal may be a pilot signal previously shared between the BS and UE or a signal obtained by modifying or duplicating a data signal. Herein, a series of signals for phase noise estimation are commonly called as the phase tracking reference signal (PT-RS).

Basically, a higher layer parameter phaseTrackingRS is configured in a higher layer parameter DMRS-DownlinkConfig (or a higher layer parameter DMRS-UplinkConfig), the UE may assume that there is a PT-RS and receive the PT-RS.

However, (i) when the higher layer parameter phaseTrackingRS is not configured or (ii) when the higher layer parameter phaseTrackingRS is configured but predetermined condition(s) are satisfied (e.g., i) when a modulation and coding scheme (MCS) less than a predetermined value is scheduled, ii) the number of scheduled RBs is less than a predetermined value, or iii) a related random network temporary identifier (RNTI) is a random access RNTI (RA-RNTI), a system information RNTI (SI-RNTI), or a paging RNTI (P-RNTI)), the UE may assume that the PT-RS is not present.

In the case of a UL PT-RS, the UE may transmit the UL PT-RS in different ways depending on whether transform precoding is enabled or disabled. However, in common, the UL PT-RS may be transmitted only in RBs for the PUSCH. When the transform precoding is disabled, the UL PT-RS may be mapped to subcarriers for a DMRS port related to a corresponding PT-RS port. In particular, the UL PT-RS may be mapped to several RBs among RBs allocated for PUSCH transmission according to frequency density, which will be described in the following.

1.5.1. Time-Domain Pattern (or Time Density)

Figure 14:
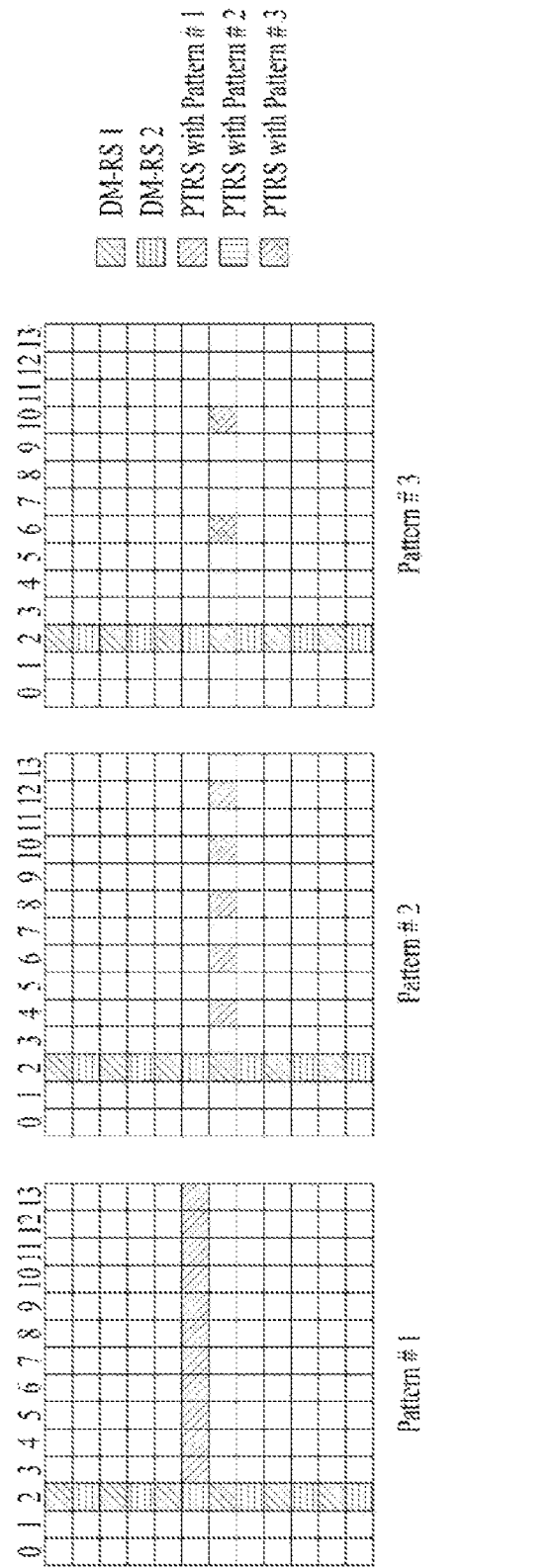
FIG. 14 is a diagram illustrating PT-RS time-domain patterns applicable to the present disclosure.

FIG. 14 is a diagram illustrating PT-RS time-domain patterns applicable to the present disclosure.

As shown in FIG. 14, the PT-RS may have different (time) patterns depending on applied MCS levels.

TABLE 4

| Scheduled MCS | Time density ($L_{PT-RS}$) |
| --- | --- |
| $I_{MCS}$ < ptrs-MCS$_1$ | PT-RS is not present |
| ptrs-MCS1 ≤ $I_{MCS}$ < ptrs-MCS2 | 4 |
| ptrs-MCS2 ≤ $I_{MCS}$ < ptrs-MCS3 | 2 |
| ptrs-MCS3 ≤ $I_{MCS}$ < ptrs-MCS4 | 1 |

Time density 1 may correspond to pattern #1 of FIG. 14, time density 2 may correspond to pattern #2 of FIG. 14, and time density 4 may correspond to pattern #3 of FIG. 14.

The parameters ptrs-MCS1, ptrs-MCS2, ptrs-MCS3, and ptrs-MCS4 in Table 4 may be defined by higher layer signaling.

1.5.2. Frequency-Domain Pattern (or Frequency Density)

According to the present disclosure, the PT-RS may be mapped to one subcarrier every RB, one subcarrier every two RBs, or one subcarrier every four RBs for transmission thereof. In this case, the frequency-domain pattern (or frequency density) of the PT-RS may be vary depending on the scheduled bandwidth.

TABLE 5

| Scheduled bandwidth | Frequency density ($K_{PT-RS}$) |
| --- | --- |
| $N_{RB} < N_{RB0}$ | PT-RS is not present |
| $N_{RB0} \leq N_{RB} < N_{RB1}$ | 2 |
| $N_{RB1} \leq N_{RB}$ | 4 |

In this case, frequency density 2 may correspond to a frequency-domain pattern where the PT-RS is mapped to one subcarrier every two RBs and transmitted, and frequency density 4 may correspond to a frequency-domain pattern where the PT-RS is mapped to one subcarrier every four RBs and transmitted.

In this configuration, $N_{RB0}$ and $N_{RB1}$, which are reference values of the scheduled bandwidth for determining the frequency density, may be defined by higher layer signaling.

1.6. DCI Format

The NR system to which the present disclosure is applicable may support the following DCI formats. Specifically, the NR system may support DCI format 0_0 and DCI format 0_1 for PUSCH scheduling and support DCI format 1_0 and DCI format 1_1 for PDSCH scheduling. In addition, the NR system may additionally support DCI format 2_0, DCI format 2_1, DCI format 2_2, and DCI format 2_3 for other purposes.

DCI format 0_0 may be used to schedule a transmission port (TB)-based (or TB-level) PUSCH, and DCI format 0_1 may be used to schedule the TB-based (or TB-level) PUSCH or a code block group (CBG)-based (or CBG-level) PUSCH (when CBG-based signal transmission and reception are configured).

DCI format 1_0 may be used to schedule a TB-based (or TB-level) PDSCH, and DCI format 1_1 may be used to schedule the TB-based (or TB-level) PDSCH or a CBG-based (or CBG-level) PDSCH (when the CBG-based signal transmission and reception are configured).

DCI format 2_0 may be used to notify a slot format. DCI format 2_1 may be used to notify PRB(s) and OFDM symbol(s) where a UE assumes that no transmission is intended for the UE. DCI format 2_2 may be used to transmit transmission power control (TPC) commands for the PUCCH and the PUSCH. DCI format 2_3 may be used to transmit a group of TPC commands for SRS transmission at one or more UEs.

Specifically, DCI format 1_1 may include modulation and coding scheme (MCS)/new data indicator (NDI)/redundancy version (RV) fields for TB 1 and further include MCS/NDI/RV fields for TB 2 only when a higher layer parameter maxNrofCodeWordsScheduledByDCI in a higher layer parameter PDSCH-Config is set to n2 (i.e., 2).

The details of the DCI formats may be found in 3GPP TS 28.212. That is, the features of the DCI formats which are not described in the present disclosure may be found in the above document. In addition, the definitions of all terms used herein may also found in the specification document.

1.7. Control Resource Set (CORESET)

One CORESET includes $N^{CORESET}_{RB}$ RBs in the frequency domain and $N^{CORESET}_{symb}$ symbols (having a value of 1, 2, or 3) in the time domain.

One CCE includes 6 REGs and one REG is equal to one RB in one OFDM symbol. REGs in the CORESET are numbered in a time-first manner Specifically, the REGs are numbered starting with '0' for the first OFDM symbol and the lowest-numbered RB in the CORESET.

A plurality of CORESETs may be configured for one UE. Each CORESET is related only to one CCE-to-REG mapping relationship.

For one CORESET, CCE-to-REG mapping may be interleaved or non-interleaved.

Configuration information about the CORESET may be configured by a higher layer parameter ControlResourceSet IE.

In addition, configuration information about CORESET 0 (e.g., common CORESET) may be configured by a higher layer parameter ControlResourceSetZero IE.

1.8. Antenna Port Quasi Co-Location

One UE may be configured with a list of up to M transmission configuration indicator (TCI) state configurations. The maximum of M TCI-state configurations may be configured by the higher layer parameter PDSCH-Config (for the UE) to decode a PDSCH according to a detected PDCCH with DCI intended for the UE and a given serving cell. Herein, M may be determined depending on the capability of the UE.

Each TCI state contains a parameter for configuring a QCL relationship between one or two DL RSs and the DMRS ports of the PDSCH. The QCL relationship is configured by a higher layer parameter qcl-Type1 for a first DL RS and a higher layer parameter qcl-Type2 for a second DL RS (if configured). For the two DL RSs, the QCL types shall not be the same, regardless of whether the RSs are the same DL RS or different DL RSs. The QCL type corresponds to each DL RS given by a higher layer parameter qcl-Type in a higher layer parameter QCL-Info and may have one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

The UE receives an activation command used to map up to 8 TCI states to code points of a TCI field in DCI. When a HARQ-ACK signal for a PDSCH carrying the activation command is transmitted in slot #n, mapping between the TCI states and the code points of the TCI field in the DCI may be applied starting from slot $\#(n+3*N^{subframe,\mu}_{slot}+1)$. In this case, $N^{subframe,\mu}_{slot}$ is determined based on Table 1 or 2 described above. After receiving the initial higher layer configurations of the TCI states and before receiving the activation command, the UE assumes that the DMRS port(s) of the PDSCH of the serving cell are QCLed with an SS/PBCH block determined in the initial access procedure with respect to 'QCL-TypeA'. Additionally, the UE may assume that the DMRS port(s) of the PDSCH of the serving cell are QCLed with the SS/PBCH block determined in the initial access procedure with respect to 'QCL-TypeD' at the above timing.

If a higher layer parameter tci-PresentInDCI is set as 'enabled' for a CORESET scheduling the PDSCH, the UE assumes that the TCI field is present in a PDCCH of DCI format 1_1 transmitted on the CORESET. When the higher layer parameter tci-PresentInDCI is not configured for the CORESET scheduling the PDSCH or the PDSCH is scheduled by DCI format 1_0, if a time offset between the reception of the DL DCI and the reception of the corresponding PDSCH is greater than or equal to a threshold Threshold-Sched-Offset (where the threshold is based on UE capability), the UE assumes that the TCI state or QCL assumption for the PDSCH is the same as the TCI state or QCL assumption applied to the CORESET used for the PDCCH transmission in order to determine PDSCH antenna port QCL.

If the higher layer parameter tci-PresentInDCI is set as 'enabled', the TCI field in DCI scheduling a component carrier (CC) points to activated TCI states in the scheduled CC or a DL BW, and a PDSCH is scheduled by DCI format 1_1, the UE uses a TCI state according to the TCI field in the DCI in a detected PDCCH to determine the PDSCH antenna port QCL. If the time offset between the reception of the DL DCI and the reception of the corresponding PDSCH is greater than or equal to the threshold Threshold-Sched-Offset (where the threshold is determined based on reported UE capability), the UE assumes that DMRS port(s) of the PDSCH of the serving cell are QCLed with RS(s) in the TCI state with respect to QCL type parameter(s) given by an indicated TCI state. When the UE is configured with a single-slot PDSCH, the indicated TCI state should be based on activated TCI states in a slot with the scheduled PDSCH. When the UE is configured with a CORESET associated with a search space set for cross-carrier scheduling, the UE expects that the higher layer parameter tci-PresentInDCI is set as 'enabled' for the CORESET. If one or more of the TCI states configured for the serving cell scheduled by the search space set contains 'QCL-TypeD', the UE expects the time offset between the reception of the detected PDCCH in the search space set and the reception of the corresponding PDSCH is greater than or equal to the threshold Threshold-Sched-Offset.

For both the cases where the higher layer parameter tci-PresentInDCI is set as 'enabled' and the higher layer parameter tci-PresentInDCI is not configured in RRC connected mode, if the time offset between the reception of the DL DCI and the corresponding PDSCH is less than the threshold Threshold-Sched-Offset, the UE may use the following assumptions: (i) the DMRS port(s) of the PDSCH of the serving cell are QCLed with the RS(s) in the TCI state with respect to QCL parameter(s); and (ii) the QCL parameter(s) are used for PDCCH QCL indication of the CORESET associated with a search space monitored with the lowest CORESET-ID in the latest slot in which one or more CORESETs within the active BWP of the serving cell are monitored by the UE. (For both the cases when higher layer parameter tci-PresentInDCI is set to 'enabled' and the higher layer parameter tci-PresentInDCI is not configured in RRC connected mode, if the offset between the reception of the DL DCI and the corresponding PDSCH is less than the threshold Threshold-Sched-Offset, the UE may assume that the DM-RS ports of PDSCH of a serving cell are quasi co-located with the RS(s) in the TCI state with respect to the QCL parameter(s) used for PDCCH quasi co-location indication of the CORESET associated with a monitored search space with the lowest CORESET-ID in the latest slot in which one or more CORESETs within the active BWP of the serving cell are monitored by the UE.)

In this case, if 'QCL-TypeD' of a PDSCH DM-RS is different from 'QCL-TypeD' of a PDCCH DM-RS which overlaps with the PDSCH DM-RS in at least one symbol, the UE is expected to prioritize the reception of the PDCCH associated with a corresponding CORESET. This operation may be equally applied to an intra-band CA case (when the PDSCH and the CORESET are on different CCs). If there are no TCI states including 'QCL-TypeD' among configured TCI states, the UE obtains different QCL assumptions from TCI states indicated for a scheduled PDSCH, regardless of the time offset between the reception of the DL DCI and the reception of the corresponding PDSCH.

For a periodic CSI-RS resource in a higher layer parameter NZP-CSI-RS-ResourceSet configured with a higher layer parameter trs-Info, the UE may need to assume that that a TCI state indicates one of the following QCL type(s):
  'QCL-TypeC' with an SS/PBCH block and, when (QCL-TypeD is) applicable, 'QCL-TypeD' with the same SS/PBCH block, or
  'QCL-TypeC' with an SS/PBCH block and, when (QCL-TypeD is) applicable, 'QCL-TypeD' with a periodic CSI-RS resource in the higher layer parameter NZP-CSI-RS-ResourceSet configured with a higher layer parameter repetition.

For a CSI-RS resource in the higher layer parameter NZP-CSI-RS-ResourceSet configured without the higher layer parameter trs-Info and without the higher layer parameter repetition, the UE may need to assume that a TCI state indicates one of the following QCL type(s):
  'QCL-TypeA' with a CSI-RS resource in the higher layer parameter NZP-CSI-RS-ResourceSet configured with the higher layer parameter trs-Info and, when (QCL-TypeD is) applicable, 'QCL-TypeD' with the same CSI-RS resource, or
  'QCL-TypeA' with a CSI-RS resource in the higher layer parameter NZP-CSI-RS-ResourceSet configured with the higher layer parameter trs-Info and, when (QCL-TypeD is) applicable, 'QCL-TypeD' with an SS/PBCH, or
  'QCL-TypeA' with a CSI-RS resource in the higher layer parameter NZP-CSI-RS-ResourceSet configured with the higher layer parameter trs-Info and, when (QCL-TyepD is) applicable, 'QCL-TypeD' with a periodic CSI-RS resource in the higher layer parameter NZP-CSI-RS-ResourceSet configured with the higher layer parameter repetition, or
  'QCL-TypeB' with a CSI-RS resource in the higher layer parameter NZP-CSI-RS-ResourceSet configured with the higher layer parameter trs-Info when 'QCL-TypeD' is not applicable.

For a CSI-RS resource in the higher layer parameter NZP-CSI-RS-ResourceSet configured with the higher layer parameter repetition, the UE may need to assume that a TCI state indicates one of the following QCL type(s):
  'QCL-TypeA' with a CSI-RS resource in the higher layer parameter NZP-CSI-RS-ResourceSet configured with the higher layer parameter trs-Info and, when (QCL-TypeD is) applicable, 'QCL-TypeD' with the same CSI-RS resource, or
  'QCL-TypeA' with a CSI-RS resource in the higher layer parameter NZP-CSI-RS-ResourceSet configured with the higher layer parameter trs-Info and, when ('QCL-TypeD' is) applicable, 'QCL-TypeD' with a CSI-RS resource in the higher layer parameter NZP-CSI-RS-ResourceSet configured with the higher layer parameter repetition, or
  'QCL-TypeC' with an SS/PBCH block and, when (QCL-TypeD is) applicable, 'QCL-TypeD' with the same SS/PBCH block.

For the DMRS of a PDCCH, the UE may need to assume that a TCI state indicates one of the following QCL type(s):
  'QCL-TypeA' with a CSI-RS resource in the higher layer parameter NZP-CSI-RS-ResourceSet configured with the higher layer parameter trs-Info and, when (QCL-TypeD is) applicable, 'QCL-TypeD' with the same CSI-RS resource, or
  'QCL-TypeA' with a CSI-RS resource in the higher layer parameter NZP-CSI-RS-ResourceSet configured with the higher layer parameter trs-Info and, when (QCL-TypeD is) applicable, 'QCL-TypeD' with a CSI-RS resource in the higher layer parameter NZP-CSI-RS-ResourceSet configured with the higher layer parameter repetition, or
  'QCL-TypeA' with a CSI-RS resource in the higher layer parameter NZP-CSI-RS-ResourceSet configured without the higher layer parameter trs-Info and without the higher layer parameter repetition and, when (QCL-TypeD is) applicable, 'QCL-TypeD' with the same CSI-RS resource.

For the DMRS of a PDSCH, the UE may need to assume that a TCI state indicates one of the following QCL type(s):
  'QCL-TypeA' with a CSI-RS resource in the higher layer parameter NZP-CSI-RS-ResourceSet configured with the higher layer parameter trs-Info and, when (QCL-TypeD is) applicable, 'QCL-TypeD' with the same CSI-RS resource, or
  'QCL-TypeA' with a CSI-RS resource in the higher layer parameter NZP-CSI-RS-ResourceSet configured with the higher layer parameter trs-Info and, when (QCL-TypeD is) applicable, 'QCL-TypeD' with a CSI-RS resource in the higher layer parameter NZP-CSI-RS-ResourceSet configured with the higher layer parameter repetition, or
  'QCL-TypeA' with a CSI-RS resource in the higher layer parameter NZP-CSI-RS-ResourceSet configured without the higher layer parameter trs-Info and without the higher layer parameter repetition and, when (QCL-TypeD is) applicable, 'QCL-TypeD' with a CSI-RS resource with the same CSI-RS resource.

2. Proposed Embodiments

Hereinafter, configurations according to the present disclosure will be described in detail based on the above-described technical features.

According to Rel-15 NR, if a UE receiving the PDSCH is configured with the higher layer parameter phaseTrackingRS (or a higher layer parameter PTRS-DownlinkConfig), the UE may assume that the following configurations do not occur simultaneously for the received PDSCH:
  Any one DMRS port among DMRS ports 1004 to 1007 for DMRS configuration type 1 or any one DMRS port among DMRS ports 1006 to 1011 for DMRS configuration type 2 are scheduled to the UE, and other UE(s) share DMRS REs on the same code division multiplexing (CDM) group(s), and
  The PT-RS is transmitted to the UE.

According to Rel-15 NR, if a UE transmitting the PUSCH is configured with the higher layer parameter phaseTrackingRS (or the higher layer parameter PTRS-DownlinkConfig), the UE may assume that the following configurations do not occur simultaneously for the transmitted PUSCH:
  Any one DMRS ports among DMRS ports 4 to 7 for DMRS configuration type 1 or any one DMRS port among DMRS ports 6 to 11 for DMRS configuration type 2 is scheduled to the UE, and
  The PT-RS is transmitted from the UE.

From the above restrictions, it may be seen that when the PT-RS is transmitted, DMRS ports #1004 to #1007 for DMRS configuration type 1 (or DMRS ports #1006 to #1011 for DMRS configuration type 2) are not used. This is based on the following technical grounds of the prior art.

First, PT-RS transmission from a transmitting node may mean that the phase noise has a large impact. In this case, when a receiver identifies DMRS ports to which time-domain code division multiplexing (T-CDM) is applied, the channel estimation performance of the receiver may be degraded due to the phase noise. Thus, in the prior art, when the PT-RS is transmitted, T-CDM between multiple DMRS ports is restricted to avoid the channel estimation performance degradation.

However, considering that the impact of the phase noise decreases as the MCS decreases, the above restriction (without consideration of the MCS) may decrease the flexibility of signal transmission and reception.

Referring to Table 4 above, it may be seen that the PT-RS time density is configured differently according to the value of a scheduled MCS, and the PT-RS time density may increase when a relatively low MCS is scheduled. In other words, when a relatively low MCS is scheduled, the interval between symbols to which the PT-RS is mapped may increase. The reason for this is that as the MCS decreases, the impact of the phase noise decreases.

For example, when a low MCS is scheduled and the PT-RS time density is determined as 2, there may be almost no performance degradation even though two OFDM symbols adjacent in the time domain has the same CPE (Common Phase Error). That is, if a low MCS is scheduled, T-CDM between DMRS ports may rarely cause the performance degradation.

Accordingly, the present disclosure describes signal transmission and reception methods on the premise that the aforementioned restriction (T-CDM between DMRS ports is restricted) is limitedly applied only when the PT-RS time density is 1. In other words, the present disclosure describes signal transmission and reception methods based on the assumption that when the PT-RS time density is greater than 1, the DMRS is capable of being transmitted on DMRS ports #1004 to #1007 for DMRS configuration type 1.

In the following, DMRS port #1000 and DMRS ports #1001 to #1011 may be replaced with DMRS port #0 and DMRS ports #1 to #11, respectively.

In Tables below, the term 'Type' may mean a DMRS configuration type and indicate DMRS ports T-CDMed (Time-Code Division Multiplexed) (or code division multiplex(CDM)ed in the time domain (CDM-T)) for each DMRS configuration type. Thus, in case of DMRS configuration type 1, DMRS ports #1000 to #1003 may be T-CDMed with DMRS ports #1004 to #1007, respectively. In case of DMRS configuration type 2, DMRS ports #1000 to #1005 may be T-CDMed with DMRS ports #1006 to #1011, respectively.

TABLE 6

|  | Type1 | Type 2 |
| --- | --- | --- |
| CDM-T group 1 | #1000~#1003 | #1000~#1005 |
| CDM-T group 2 | #1004~#1007 | #1006~#1011 |

For convenience, the technical configurations of the present disclosure will be described mainly based on DMRS configuration type 1. However, the technical configurations of the present disclosure may be extensively applied to DMRS configuration type 2 based on the CDM-T group configuration for DMRS configuration type 2 shown in Table 6.

In addition, the technical configurations of the present disclosure will be described regarding DL signal transmission (i.e., PTRS, DMRS for the PDSCH). However, the technical configurations of the present disclosure may be extensively applied to UL signal transmission (i.e., PTRS, DMRS for the PUSCH).

Table 7 below shows a method for determining the index ($k^{RE}_{ref}$) of a reference subcarrier on which the DL PT-RS is transmitted, which is defined in Rel-15 NR TS 38.211. Referring to Table 7, it may be seen that in the prior art, the index ($k^{RE}_{ref}$) of the reference subcarrier on which the DL PT-RS is transmitted is determined by a higher layer parameter resourceElementOffset and DMRS ports related to PT-RS ports. As described above, when the DL PT-RS is transmitted, no CDM-T between DMRS ports is defined. As a result, some DMRS ports (e.g., DMRS ports #1004 to #1007 for DMRS configuration type 1 and DMRS ports #1006 to #1011 for DMRS configuration type 2) are not defined.

However, if the DMRS and PT-RS are capable of being simultaneously transmitted on DMRS ports #1004 to #1007 as proposed in the present disclosure, Table 7 below may need to be modified.

type and the higher layer parameter resourceElementOffset, it may mean that the reference subcarrier index ($k^{RE}_{ref}$) is subcarrier #N in a corresponding RB.

According to the present disclosure, if DMRS ports #1004 to #1007 are defined in spite of PT-RS transmission, reference subcarrier indices for PT-RS ports corresponding to DMRS ports #1004 to #1007 may have values which are not defined in Tables above. For example, when the higher layer parameter resourceElementOffset is 00, the reference subcarrier indices for the PT-RS ports corresponding to DMRS ports #1004 to #1007 may be set to 4, 6, 5, and 7, respectively.

According to this configuration, the number of subcarriers for PT-RS transmission in one RB may be 8. As a result, the flexibility of a channel state information reference signal (CSI-RS) resource location capable of avoiding a collision with the PT-RS may be significantly degraded. Therefore, when the PT-RS collides with a CSI-RS, the PT-RS may be punctured so that the performance may be significantly degraded.

Figure 15:
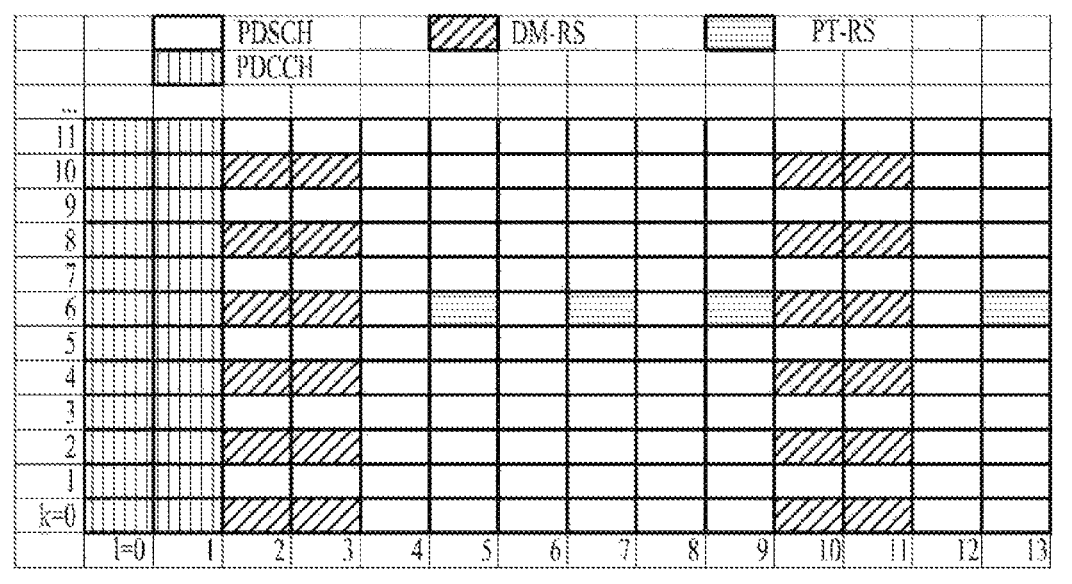

FIG. 15 is a diagram schematically illustrating a configuration in which DL signals are transmitted when the time density of the PT-RS is 2.

As shown in FIG. 15, when the time density of the PT-RS is 2 or higher, a PT-RS corresponding to any one DMRS port among DMRS ports #1000 to #1003 may be allocated to the same frequency location as the any one DMRS port. In this

TABLE 7

| DM-RS antenna port | $k^{RE}_{ref}$ | | | | | | | |
|---|---|---|---|---|---|---|---|---|
| | DM-RS Configuration type 1 resourceElementOffset | | | | DM-RS Configuration type 2 resourceElementOffset | | | |
| p | 00 | 01 | 10 | 11 | 00 | 01 | 10 | 11 |
| 1000 | 0 | 2 | 6 | 8 | 0 | 1 | 6 | 7 |
| 1001 | 2 | 4 | 8 | 10 | 1 | 6 | 7 | 0 |
| 1002 | 1 | 3 | 7 | 9 | 2 | 3 | 8 | 9 |
| 1003 | 3 | 5 | 9 | 11 | 3 | 8 | 9 | 2 |
| 1004 | — | — | — | — | 4 | 5 | 10 | 11 |
| 1005 | — | — | — | — | 5 | 10 | 11 | 4 |

Additionally, the index ($k^{RE}_{ref}$) of the reference subcarrier on which the DL PT-RS is transmitted, which is defined in Rel-15 NR TS 38.211, may be defined as shown in Table 8 below. According to the present disclosure, Table 8 below may also need to be modified.

case, the PDSCH (or data) may be transmitted on REs, where no PT-RS is transmitted, on subcarriers to which the PT-RS is mapped.

Considering the DL signal configuration of FIG. 15, the present disclosure describes a method for determining the

TABLE 8

| DM-RS antenna port | $k^{RE}_{ref}$ | | | | | | | |
|---|---|---|---|---|---|---|---|---|
| | DM-RS Configuration type 1 resourceElementOffset | | | | DM-RS Configuration type 2 resourceElementOffset | | | |
| $\tilde{p}$ | 00 | 01 | 10 | 11 | 00 | 01 | 10 | 11 |
| 0 | 0 | 2 | 6 | 8 | 0 | 1 | 6 | 7 |
| 1 | 2 | 4 | 8 | 10 | 1 | 6 | 7 | 0 |
| 2 | 1 | 3 | 7 | 9 | 2 | 3 | 8 | 9 |
| 3 | 3 | 5 | 9 | 11 | 3 | 8 | 9 | 2 |
| 4 | — | — | — | — | 4 | 5 | 10 | 11 |
| 5 | — | — | — | — | 5 | 10 | 11 | 4 |

In Tables 7 and 8, when the reference subcarrier index ($k^{RE}_{ref}$) is N, which is based on the DMRS configuration resource location of a PT-RS port corresponding to any one of DMRS ports #1004 to #1007 on the REs, where no PT-RS is mapped, on the subcarriers to which the PT-RS (corresponding to the any one DMRS port among DMRS ports #1000 to #1003) is mapped.

According to the method proposed in the present disclosure, PT-RS ports respectively associated with T-CDMed DMRS ports may have the same frequency location.

In DMRS configuration type 1, the reference subcarrier index of a PT-RS port corresponding to each DMRS port may be defined as shown in Table 9 below.

TABLE 9

| DMRS antenna port | resourceElementOffset | | | |
|---|---|---|---|---|
| | 00 | 01 | 10 | 11 |
| 0/4 | 0 | 2 | 6 | 8 |
| 1/5 | 2 | 4 | 8 | 10 |
| 2/6 | 1 | 3 | 7 | 9 |
| 3/7 | 3 | 5 | 9 | 11 |

Referring to Table 9, it may be seen that different PT-RS ports respectively corresponding to DMRS ports #0 and #4 (or DMRS ports #1000 and #1004) have the same frequency location.

In DMRS configuration type 2, the reference subcarrier index of a PT-RS port corresponding to each DMRS port may be defined as shown in Table 10 below.

TABLE 10

| DMRS antenna port | resourceElementOffset | | | |
|---|---|---|---|---|
| | 00 | 01 | 10 | 11 |
| 0/6 | 0 | 1 | 6 | 7 |
| 1/7 | 1 | 6 | 7 | 0 |
| 2/8 | 2 | 3 | 8 | 9 |
| 3/9 | 3 | 8 | 9 | 2 |

TABLE 10-continued

| DMRS antenna port | resourceElementOffset | | | |
|---|---|---|---|---|
| | 00 | 01 | 10 | 11 |
| 4/10 | 4 | 5 | 10 | 11 |
| 5/11 | 5 | 10 | 11 | 4 |

Referring to Table 10, it may be seen that different PT-RS ports respectively corresponding to DMRS ports #0 and #6 (or DMRS ports #1000 and #1006) have the same frequency location.

To this end, the time resource location of a PT-RS port may be determined based on the resource location of an additional DMRS port, the PT-RS time density, the duration of the PDSCH (or PUSCH), DMRS port indices, and/or higher layer signaling (e.g., RRC signaling).

According to Rel-15 NR, the time resource location of a PT-RS port has been determined based only on a combination of the additional DMRS, the PT-RS time density, and the PDSCH (or PUSCH) duration.

TABLE 11

The set of time indices l defined relative to the start of the PDSCH allocation is defined by
1. set i = 0 and $l_{ref}$ = 0
2. if any symbol in the interval max($l_{ref}$ + (i − 1)$L_{PTRS}$ + 1,$l_{ref}$)....,$l_{ref}$ + i$L_{PTRS}$ overlaps with a symbol used for DM-RS according to clause 7.4.1.1.2
   - set i = 1
   - set $l_{ref}$ to the symbol index of the DM-RS symbol in case of a single-symbol DM-RS and to the symbol index of the second DM-RS symbol in case of a double-symbol DM-RS
   - repeat from step 2 as long as $l_{ref}$ + i$L_{PTRS}$ is inside the PDSCH allocation
3. add $l_{ref}$ + i$L_{PTRS}$ to the set of time indices for PT-RS
4. increment i by one
5. repeat from step 2 above us long as $l_{ref}$ + i$L_{PTRS}$ is inside the PDSCH allocation However, according to the present disclosure, the time resource location of a PT-RS may be determined based on DMRS port indices and/or higher layer signaling in addition to the above-described elements (or parameters).

2.1. First Method

According to a first method proposed in the present disclosure, the time resource location of the PT-RS may be determined by further considering an additional parameter α as shown in Table 12 below. The additional parameter α may be determined based on the PT-RS time density, DMRS port indices, and/or higher layer signaling (e.g., RRC).

TABLE 12

The set of time indices l defined relative to the start of the PDSCH allocation is defined by
1. set i = 0 and $l_{ref}$ = 0
2. if any symbol in the interval max($l_{ref}$ + (i − 1)$L_{PTRS}$ + 1,$l_{ref}$)....,$l_{ref}$ + i$L_{PTRS}$ overlaps with a symbol used for DM-RS according to clause 7.4.1.1.2
   - set i = 1
   - set $l_{ref}$ to the symbol index of the DM-RS symbol in case of a single-symbol DM-RS and to the symbol index of the second DM-RS symbol in case of a double-symbol DM-RS
   - repeat from step 2 as long as $l_{ref}$ + i$L_{PTRS}$ is inside the PDSCH allocation TABLE 12-continued 3. add $l_{ref} + iL_{PTRS} - \alpha$ to the set of time indices for PT-RS
4. increment i by one
5. repeat from step 2 above as long as $l_{ref} + iL_{PTRS}$ is inside the PDSCH allocation In the present disclosure, the value of α may be determined as shown in Table 13. In this case, if the UE is not configured with a higher layer parameter resourceTimeOffset, the UE may expect/consider that the higher layer parameter resourceTimeOffset has a default value of 00.

The configuration shown in Table 13 below may be applied independently of the PT-RS time density. Although Table 13 shows that the value of α is set to 0 or 1, α may have a different value (e.g., α=−1) in some embodiments.

TABLE 13

| | DMRS port index (DMRS Type 1) | | DMRS port index (DMRS Type 2) | |
|---|---|---|---|---|
| resourceTimeOffset | #1000~#1003 | #1004~#1007 | #1000~#1005 | #1006~#1011 |
| 00 (Default) | α = 0 | α = 1 | α = 0 | α = 1 |
| 01 | α = 1 | α = 0 | α = 1 | α = 0 |

Additionally, the range of α values may configured differently according to the PT-RS time density. For example, when the time density is 2, α may have one of the following values: −1, 0, and 1. When the time density is 4, α may have one of the following values: −3, −2, −1, 0, 1, 2, and 3. In particular, when the time density is 2, the value of α may be defined as shown in Table 13. When the time density is 4, the value of α may be defined as shown in Table 14.

TABLE 14

| | DMRS port index (DMRS Type 1) | | DMRS port index (DMRS Type 2) | |
|---|---|---|---|---|
| resourceTimeOffset | #1000~#1003 | #1004~#1007 | #1000~#1005 | #1006~#1011 |
| 00 (Default) | α = 0 | α = 3 | α = 0 | α = 3 |
| 01 | α = 3 | α = 0 | α = 3 | α = 0 |

If the result of the third process (or procedure) shown in Table 12 is a negative value, the BS and UE may assume that no PT-RS is allocated based on the corresponding negative value and expect that the fourth process (or procedure) will be performed.

According to the above-described method, the time resource location of a PT-RS port corresponding to any one of DMRS ports #1004 to #1007 may be determined. Hereinafter, a description will be given based on the time resource location of a PT-RS port corresponding to DMRS port #1004, for convenience of description. However, the PT-RS port corresponding to DMRS port #1004 may extend to a PT-RS port corresponding to any one of DMRS ports #1005 to #1007.

Figure 16:
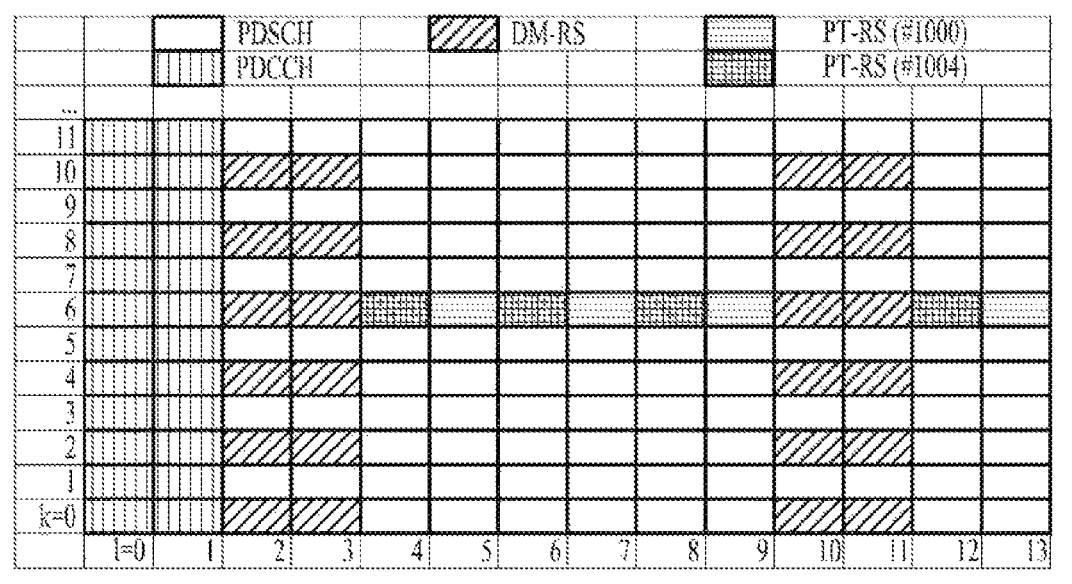

FIG. 16 is a diagram schematically illustrating PT-RS resource locations according to an example of the present disclosure.

In FIG. 16, it is assumed that the PDSCH duration is 14 symbols (PDSCH duration=14), the DMRS configuration type is DMRS configuration type 1, the PT-RS time density is 2, the higher layer parameter resourceElementOffset is set to 10 (see Table 6), and the higher layer parameter resourceTimeOffset is set to 00 (see Table 13). In this case, the time resource location of a PT-RS corresponding to DMRS port #1000 and the time resource location of a PT-RS corresponding to DMRS port #1004 may be configured as shown in FIG. 16.

Figure 17:
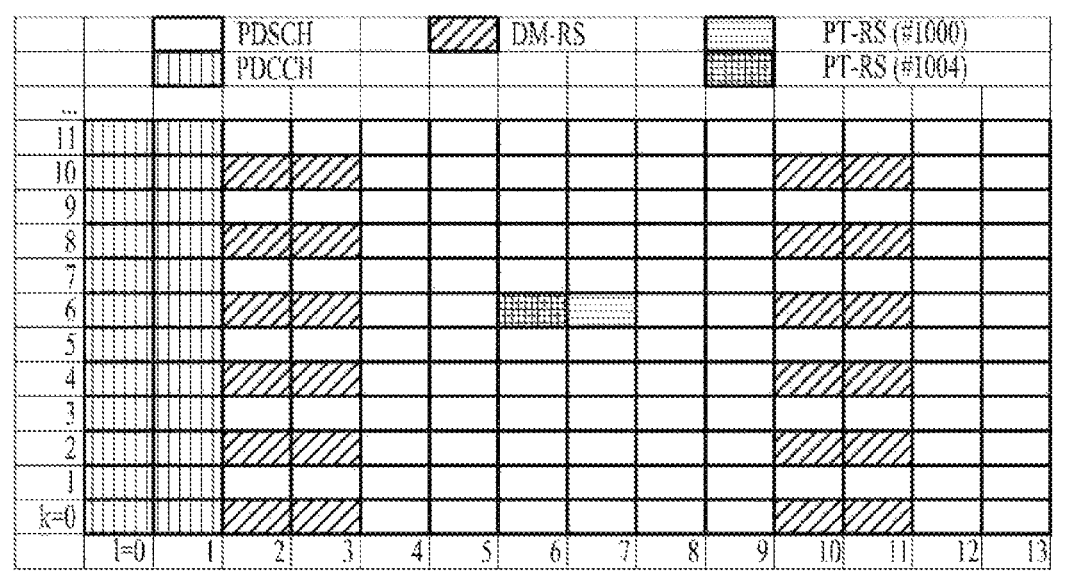

FIG. 17 is a diagram schematically illustrating PT-RS resource locations according to another example of the present disclosure.

In FIG. 17, it is assumed that the PDSCH duration is 14 symbols (PDSCH duration=14), the DMRS configuration type is DMRS configuration type 1, the PT-RS time density is 4, the higher layer parameter resourceElementOffset is set to 10 (see Table 6), and the higher layer parameter resourceTimeOffset is set to 00 (see Table 14). In this case, the time resource location of the PT-RS corresponding to DMRS port #1000 and the time resource location of the PT-RS corresponding to DMRS port #1004 may be configured as shown in FIG. 17.

Figure 18:
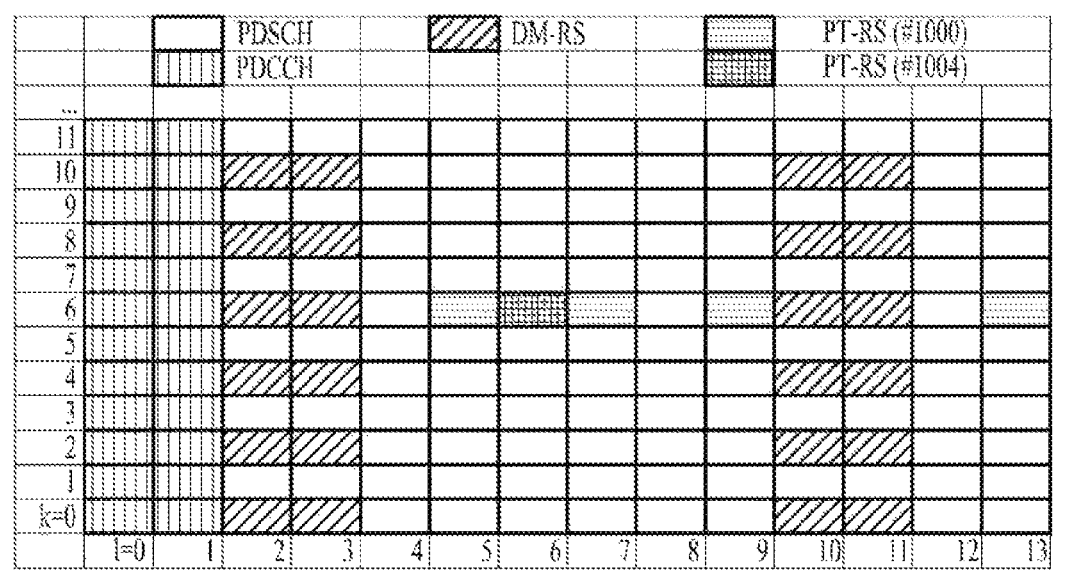

FIG. 18 is a diagram schematically illustrating PT-RS resource locations according to another example of the present disclosure.

In FIG. 18, it is assumed that the PDSCH duration is 14 symbols (PDSCH duration=14), the DMRS configuration type is DMRS configuration type 1, the PT-RS time density for DMRS port #1000 is 2, the PT-RS time density for DMRS port #1004 is 4, the higher layer parameter resourceElementOffset is set to 10 (see Table 6), and the higher layer parameter resourceTimeOffset is set to 00 (see Tables 13 and 14). In this case, the time resource location of the PT-RS corresponding to DMRS port #1000 and the time resource location of the PT-RS corresponding to DMRS port #1004 may be configured as shown in FIG. 18. According to the first method proposed in the present disclosure, even when the PT-RS corresponding to DMRS port #1000 has a different time density from the PT-RS corresponding to DMRS port #1004, the time resource locations of the PT-RSs may not overlap.

Figure 19:
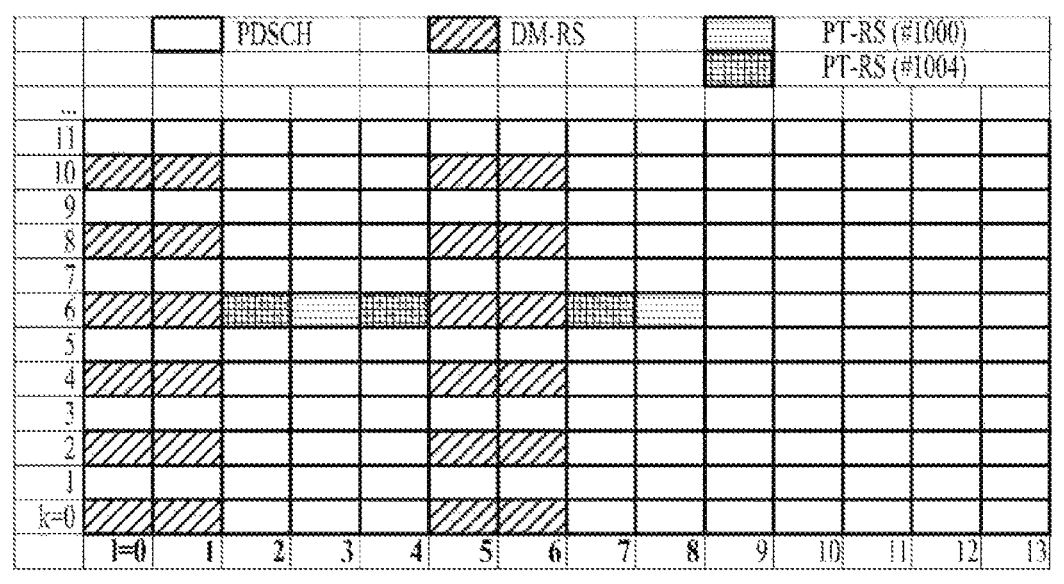

FIG. 19 is a diagram schematically illustrating PT-RS resource locations according to another example of the present disclosure.

In FIG. 19, it is assumed that the PDSCH duration is 9 symbols (PDSCH duration=9), the DMRS configuration type is DMRS configuration type 1, the PT-RS time density is 2, the higher layer parameter resourceElementOffset is set to 10 (see Table 6), and the higher layer parameter resourceTimeOffset is set to 00 (see Table 13). In this case, the time resource location of the PT-RS corresponding to DMRS port #1000 and the time resource location of the PT-RS corresponding to DMRS port #1004 may be configured as shown in FIG. 19.

Figure 20:
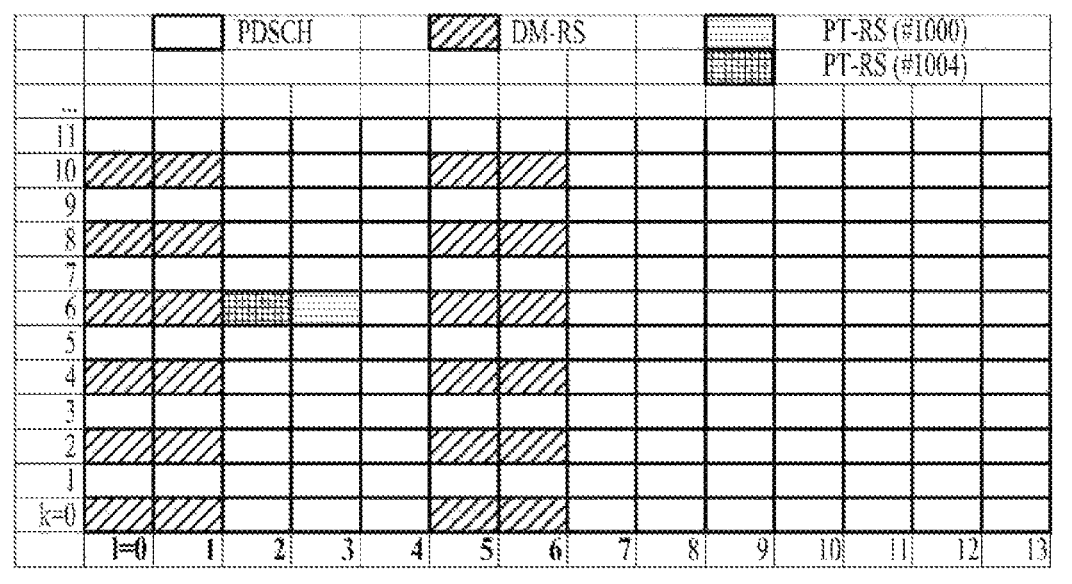

FIG. 20 is a diagram schematically illustrating PT-RS resource locations according to another example of the present disclosure.

In FIG. 20, it is assumed that the PDSCH duration is 8 symbols (PDSCH duration=8), the DMRS configuration type is DMRS configuration type 1, the PT-RS time density is 2, the higher layer parameter resourceElementOffset is set to 10 (see Table 6), and the higher layer parameter resourceTimeOffset is set to 00 (see Table 13). In this case, the time resource location of the PT-RS corresponding to DMRS port #1000 and the time resource location of the PT-RS corresponding to DMRS port #1004 may be configured as shown in FIG. 20.

Figure 21:
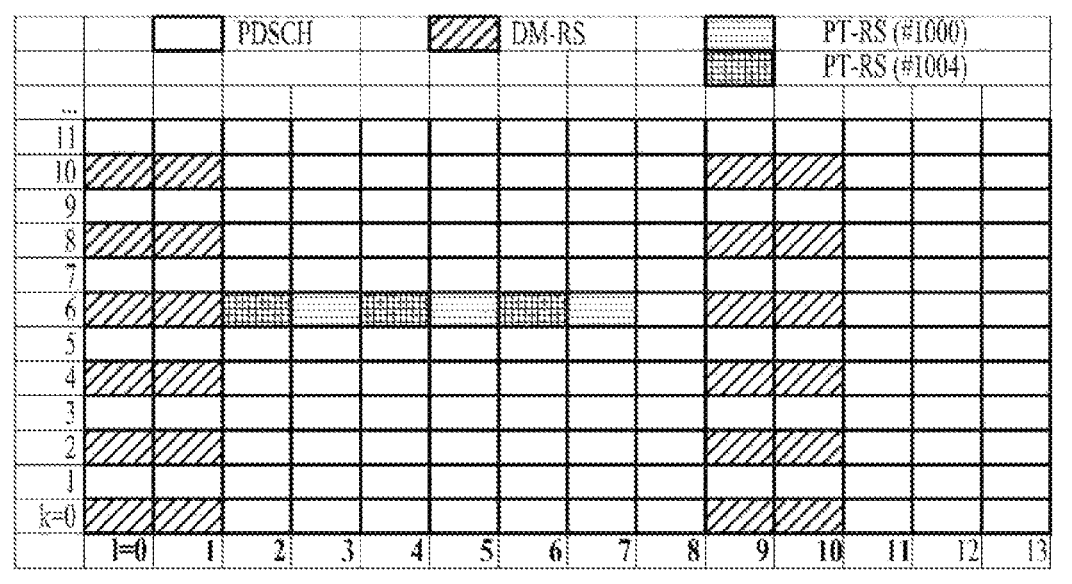

FIG. 21 is a diagram schematically illustrating PT-RS resource locations according to another example of the present disclosure.

In FIG. 21, it is assumed that the PDSCH duration is 12 symbols (PDSCH duration=12), the DMRS configuration type is DMRS configuration type 1, the PT-RS time density is 2, the higher layer parameter resourceElementOffset is set to 10 (see Table 6), and the higher layer parameter resourceTimeOffset is set to 00 (see Table 13). In this case, the time resource location of the PT-RS corresponding to DMRS port #1000 and the time resource location of the PT-RS corresponding to DMRS port #1004 may be configured as shown in FIG. 21.

2.2. Second Method

Referring to the examples of FIGS. 20 and 21 according to the above-described first method, in the case of the PT-RS associated with DMRS port #1004, the interval between a PT-RS with symbol index #6 and a DMRS with symbol index #9 is three symbols. That is, for the PT-RS of the corresponding symbol, the maximum time density is set to 3. In this case, the UE may estimate the CPE (Carrier Phase Error) based on a phase difference between OFDM symbol indices #6 and #9. Thus, the CPE estimation performance may be degraded, and the CPE estimation performance degradation may impede accurate channel estimation in OFDM symbol indices #7 and #8, thereby causing the overall performance degradation.

It may be seen that the maximum time density of time resources for the PT-RS corresponding to port #1004 is 3. That is, since this value is greater than the time density configured for the corresponding PT-RS, 2, it may cause the performance degradation. The second method according to the present disclosure proposes relates to a method of minimizing the performance degradation.

In the second method according to the present disclosure, it is proposed to consider the parameter α even in the second and fifth processes among all the processes according to the first method as shown in Table 15. According to the second method, the time resource of a PT-RS corresponding to any one of DMRS ports #1004 to #1007 may be determined as follows.

Figure 22:
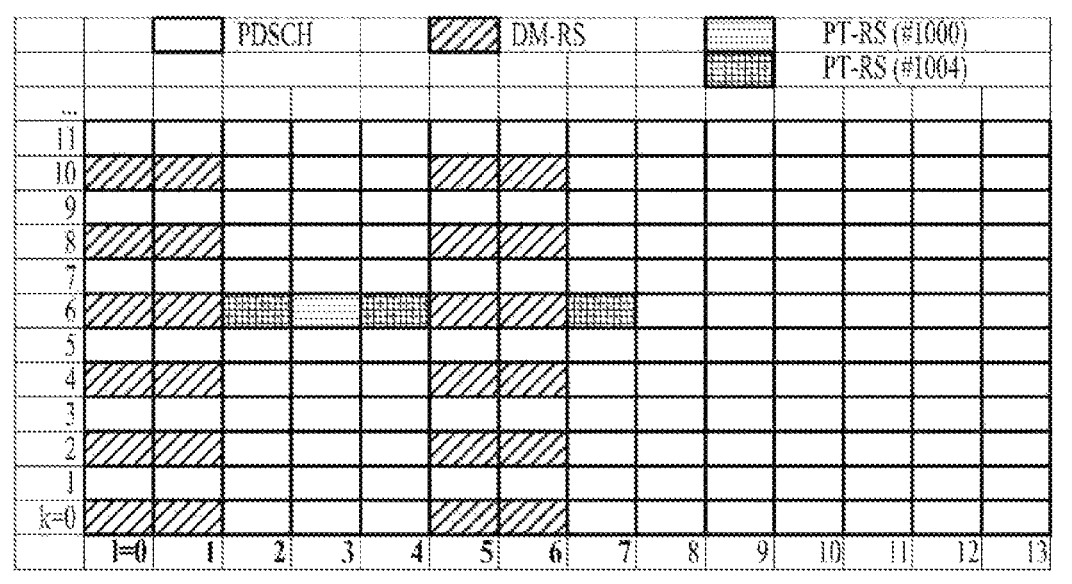

FIG. 22 is a diagram illustrating PT-RS resource locations according to another example of the present disclosure.

In FIG. 22, it is assumed that the PDSCH duration is 8 symbols (PDSCH duration=8), the DMRS configuration type is DMRS configuration type 1, the PT-RS time density is 2, the higher layer parameter resourceElementOffset is set to 10 (see Table 6), and the higher layer parameter resourceTimeOffset is set to 00 (see Table 13). In this case, the time resource location of the PT-RS corresponding to DMRS port #1000 and the time resource location of the PT-RS corresponding to DMRS port #1004 may be configured as shown in FIG. 22.

In the second method, the maximum interval between PT-RS time resources may be reduced to 2, compared to the first method. However, the reduced maximum interval may increase PT-RS port overhead (e.g., the overhead difference between the PT-RSs respectively corresponding to DMRS ports #1000 and #1004 is about three times).

Based on the above features, the BS may allocate to the UE a PT-RS with a low signal to noise ratio (SNR) or more PT-RSs for more precise synchronization. To this end, the BS may allocate a PT-RS corresponding to any one of DMRS ports #1004 to #1007 rather than DMRS ports #1000 to #1003. Alternatively, the BS may set the higher layer parameter resourceTimeOffset to 01 to allocate more PT-RSs to the UE and allocate a PT-RS corresponding to any one of DMRS ports #1000 to #1003.

Figure 23:
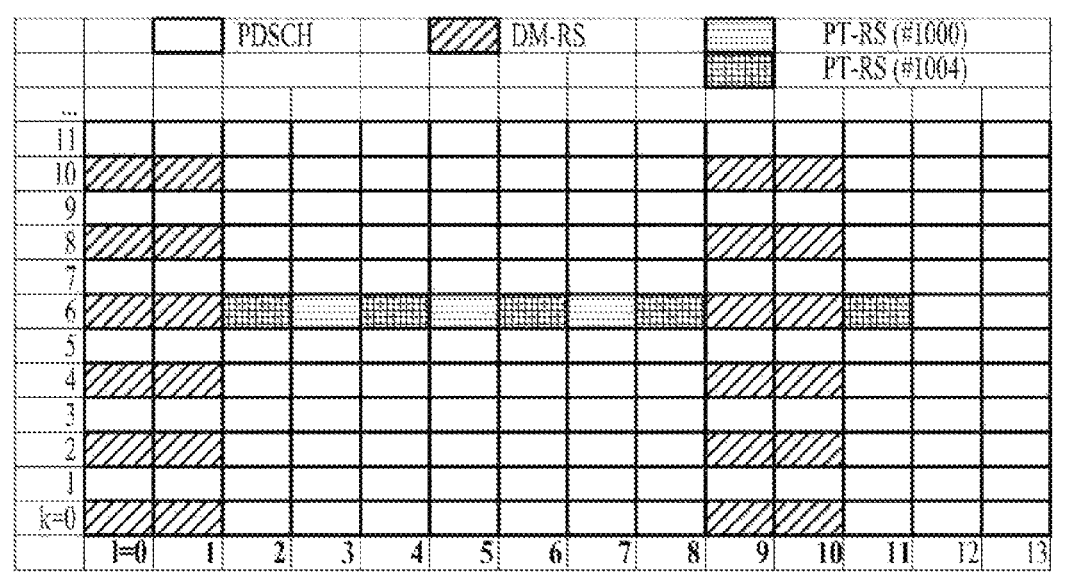

FIG. 23 is a diagram illustrating PT-RS resource locations according to another example of the present disclosure.

In FIG. 23, it is assumed that the PDSCH duration is 12 symbols (PDSCH duration=12), the DMRS configuration type is DMRS configuration type 1, the PT-RS time density is 2, the higher layer parameter resourceElementOffset is set to 10 (see Table 6), and the higher layer parameter resourceTimeOffset is set to 00 (see Table 13). In this case, the time resource location of the PT-RS corresponding to DMRS port #1000 and the time resource location of the PT-RS corresponding to DMRS port #1004 may be configured as shown in FIG. 23.

2.3. Third Method

The third method according to the present disclosure relates to a method of minimizing the performance degradation expected in the above-described first method and minimizing the RS overhead expected in the second method.

TABLE 15

1. set i = 0 and $l_{ref} = 0$
2. if any symbol in the interval $\max(l_{ref} + (i - 1)L_{PT\text{-}RS} + 1, l_{ref}) - \alpha, \ldots, l_{ref} + iL_{PT\text{-}RS} - \alpha$
   overlaps with a symbol used for DM-RS according to clause 7.4.1.1.2
   - set i = 1
   - set $l_{ref}$ to the symbol index of the DM-RS symbol in case of a single-symbol DM-RS and to the symbol index of the second DM-RS symbol in case of a double-symbol DM-RS
   - repeat from step 2 as long as $l_{ref} + iL_{PTRS} - \alpha$ is inside the PDSCH allocation
3. add $l_{ref} + iL_{PTRS} - \alpha$ to the set of time indices for PT-RS
4. increment i by one
5. repeat from step 2 above as long as $l_{ref} + iL_{PTRS} - \alpha$ is inside the PDSCH allocation

TABLE 16

1. set i = 0 and $l_{ref}$ = 0
2. if any symbol in the interval max($l_{ref}$ + (i − 1)$L_{PT-RS}$ + 1,$l_{ref}$)−α,...,$l_{ref}$ + i$L_{PT-RS}$−α
   overlaps with a symbol used for DM-RS according to clause 7.4.1.1.2
   - set i = 1
   - set $l_{ref}$ to the symbol index of the DM-RS symbol in case of a single-symbol DM-RS and to the
     symbol index of the second DM-RS symbol in case of a double-symbol DM-RS
   - repeat from step 2 as long as $l_{ref}$ + i$L_{PTRS}$ is inside the PDSCH allocation
3. add $l_{ref}$ + i$L_{PTRS}$ − α to the set of time indices for PT-RS
4. increment i by one
5. repeat from step 2 above as long as $l_{ref}$ + i$L_{PTRS}$ is inside the PDSCH allocation In the third method according to the present disclosure, it is proposed to consider the parameter α in the second process among all the processes according to the first method but not to consider the parameter α if the second process is repeated as shown in Table 16, unlike the second method. According to the third method, the time resource of a PT-RS corresponding to any one of DMRS ports #1004 to #1007 may be determined as follows.

Figure 24:
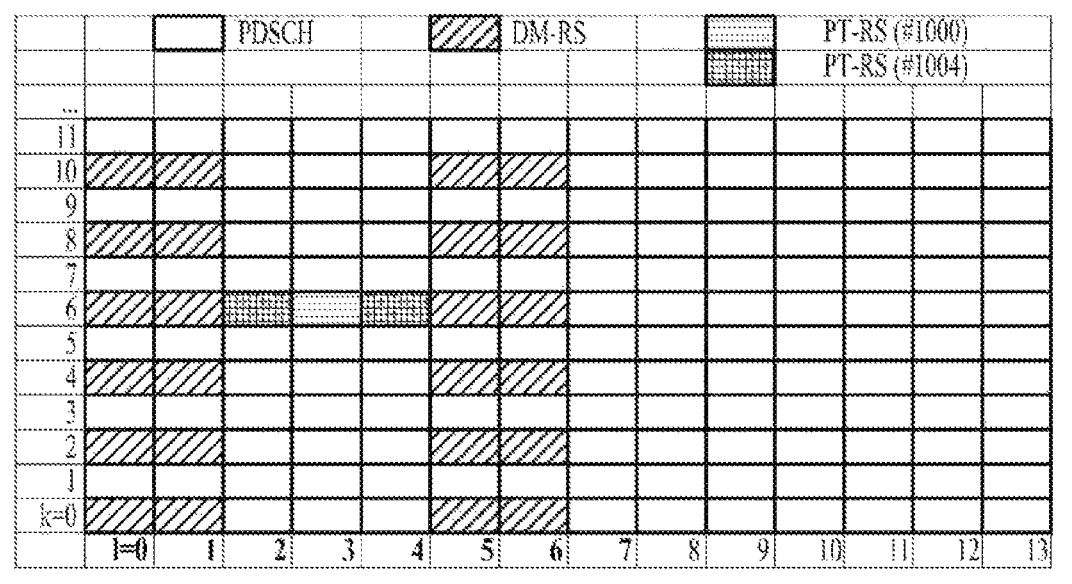

FIG. 24 is a diagram illustrating PT-RS resource locations according to another example of the present disclosure.

In FIG. 24, it is assumed that the PDSCH duration is 8 symbols (PDSCH duration=8), the DMRS configuration type is DMRS configuration type 1, the PT-RS time density is 2, the higher layer parameter resourceElementOffset is set to 10 (see Table 6), and the higher layer parameter resource Ti me Offset is set to 00 (see Table 13). In this case, the time resource location of the PT-RS corresponding to DMRS port #1000 and the time resource location of the PT-RS corresponding to DMRS port #1004 may be configured as shown in FIG. 24.

Referring to the configuration shown in FIG. 24, it may be seen that the overhead difference between the PT-RS corresponding to DMRS port #1000 and the PT-RS corresponding to DMRS port #1004 is about two times. Compared to the second method, the overhead may be reduced by about 50%.

Figure 25:
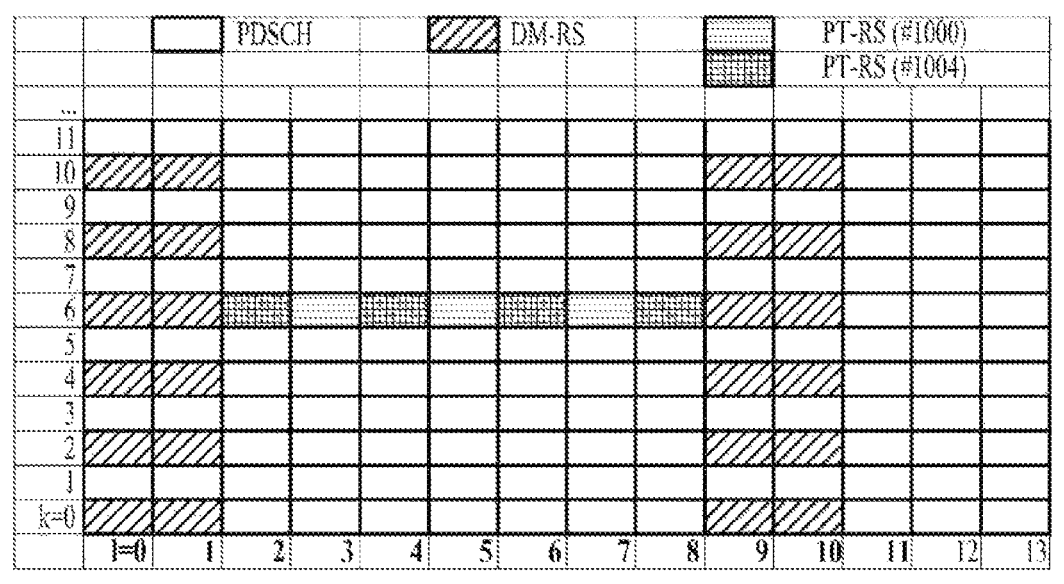

FIG. 25 is a diagram illustrating PT-RS resource locations according to another example of the present disclosure.

In FIG. 25, it is assumed that the PDSCH duration is 12 symbols (PDSCH duration=12), the DMRS configuration type is DMRS configuration type 1, the PT-RS time density is 2, the higher layer parameter resourceElementOffset is set to 10 (see Table 6), and the higher layer parameter resource-TimeOffset is set to 00 (see Table 13). In this case, the time resource location of the PT-RS corresponding to DMRS port #1000 and the time resource location of the PT-RS corresponding to DMRS port #1004 may be configured as shown in FIG. 25.

2.4. Features of the Methods Proposed in the Present Disclosure

According to the present disclosure, a PT-RS corresponding to any one of DMRS ports #1004 to #1007 may be allocated to a subcarrier to which the any one DMRS port is allocated as described above.

Eventually, since frequency resources for PT-RS allocation are not extended compared to the prior art, the same flexibility as in the prior art may be maintained when the CSI-RS frequency location capable of avoiding a collision with the PT-RS is determined. If the frequency resource location of the PT-RS corresponding to the any one of DMRS ports #1004 to #1007 is extended in the frequency domain, the CSI-RS frequency location capable of avoiding the collision with the PT-RS may be significantly restricted. As a result, the flexibility of determining the CSI-RS location may considerably decrease compared to the prior art.

Further, according to the methods proposed in the present disclosure, the flexibility of configuring a PT-RS location capable of avoiding a direct current (DC) may be maintained at the same level as in the prior art.

Specifically, according to the methods proposed in the present disclosure, there may be no collision between the PT-RS ports corresponding to DMRS ports #1000 to #1003 and the PT-RS ports corresponding to DMRS ports #1004 to #1007. Thus, even if two PT-RS ports corresponding to DMRS ports #1000 and #1004 are allocated to one UE, there is no collision between the two PT-RS ports.

However, when DMRS ports #1000, #1001, #1004, and #1005 are allocated to one UE and when DMRS ports #1000 and #1001 and DMRS ports #1004 and #1005 belong to different DMRS port groups (or CDM groups), two PT-RS ports may be defined for the UE. In this case, according to the methods proposed in the present disclosure, there may be a disadvantage in that PT-RS power boosting depending on the number of PT-RS ports is not applicable.

In the NR system, it may be more reasonable (or preferable) to allocate DMRS ports #1000, #1001, #1002, and #1003 to the UE and include DMRS ports #1000 and #1001 and DMRS ports #1002 and #1003 in different DMRS port groups (or CMD groups) rather than to allocate DMRS ports #1000 and #1001 and DMRS ports #1004 and #1005, which are included in different DMRS port groups (or CDM groups), to the UE as described in the above assumption. Unlike the assumption, since DMRS ports #1000 and #1001 and DMRS ports #1002 and #1003, which are included in different DMRS port groups (or CDM groups), are not CDM-T/code division multiplexed in the frequency domain (CDM-F), there may be no performance degradation when DMRS ports are separated. Further, according to this method, PT-RS power boosting depending on the number of PT-RS ports may also be applied.

Therefore, since it is not suitable to allocate DMRS ports #1000 and #1001 and DMRS ports #1004 and #1005, which are included in different DMRS port groups (or CDM groups), to one UE, it is expected that the above-described issues may not occur even when the present disclosure is applied.

According to the methods proposed in the present disclosure, there may be no collision between PT-RSs for two UEs only when the time densities for the two UEs are greater than 1. Thus, a separate scheduling restriction may be required for the methods proposed in the present disclosure (e.g., the time density for each of the two UEs needs to be greater than 1).

Alternatively, if the methods proposed in the present disclosure is configured to be applied only when the PT-RS time density is greater than 1, no scheduling restriction may be required. That is, only when the PT-RS time density is greater than 1, the use of DMRS ports #1004 to #1007 may be allowed. On the other hand, if the time density of any one of the two UEs is 1, the BS may restrict the use of DMRS ports #1004 to #1007. By doing so, the above-described PT-RS collision does not occur.

Figure 26:
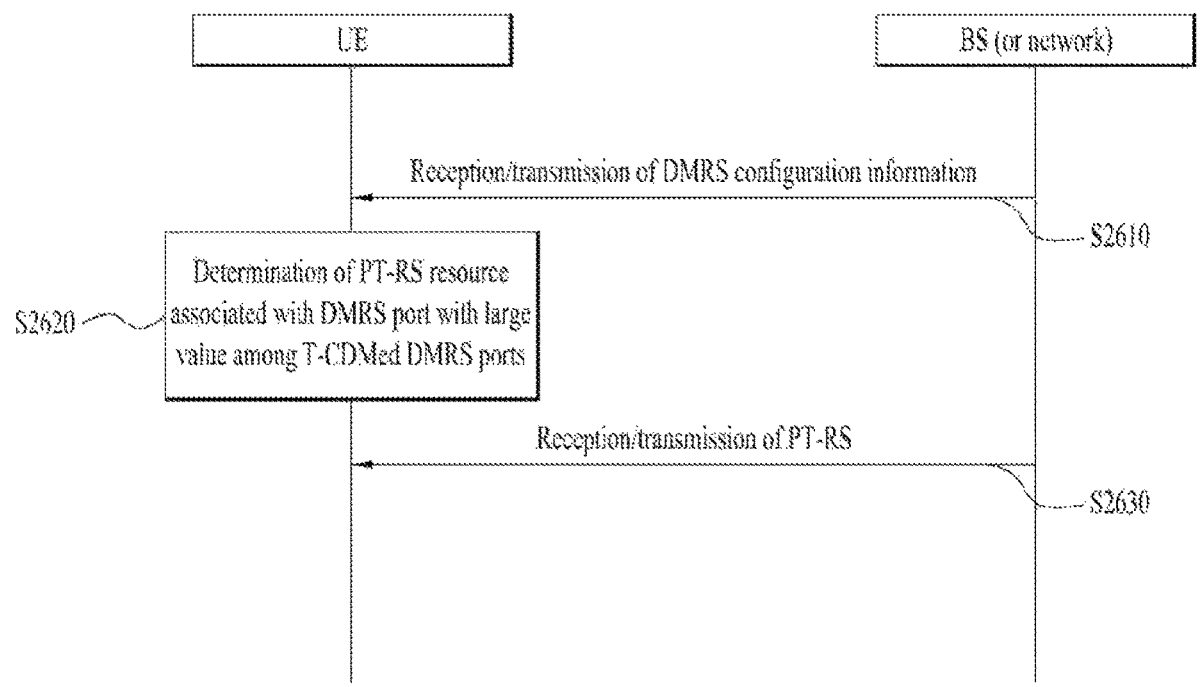
FIG. 26 is a diagram illustrating operations of a UE and a BS applicable to the present disclosure.
Figure 27:
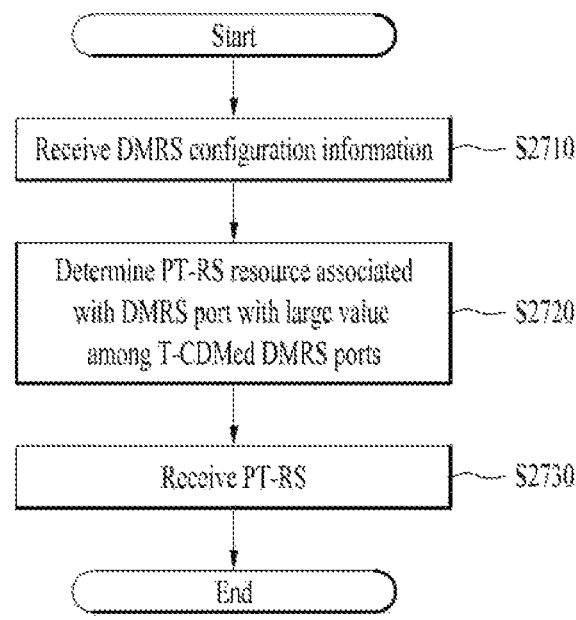
FIG. 27 is a flowchart showing the operations of the UE according to the present disclosure.
Figure 28:
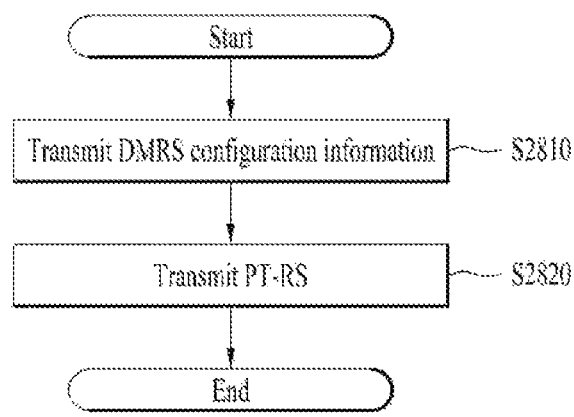
FIG. 28 is a flowchart showing the operations of the BS according to the present disclosure.

FIG. 26 is a diagram illustrating operations of a UE and a BS applicable to the present disclosure. Specifically, FIG. 27 is a flowchart showing the operations of the UE according to the present disclosure, and FIG. 28 is a flowchart showing the operations of the BS according to the present disclosure.

For the operations proposed in the present disclosure, the BS (or network) may transmit DMRS configuration information to the UE (S2610 and S2810). For example, the BS may configure DMRS configuration type 1 or DMRS configuration type 2 for the UE through the DMRS configuration information. The DMRS configuration information may be transmitted through higher layer signaling. The UE may receive the DMRS configuration information from the BS (or network) (S2610 and S1710).

According to the present disclosure, the UE may determine a first resource for a PT-RS based on the fact that the PT-RS is associated with a higher DMRS port index of two DMRS port indices which are CDM-T (S2620 and S2720). To this end, the UE may receive DCI scheduling a PDSCH related to the higher DMRS port index. In this case, the DCI may further schedule the PT-RS.

The first resource may be located (i) on the same subcarrier as a second resource for the PT-RS associated with a lower DMRS port index of the two CDM-T DMRS port indices and (ii) on a different symbol from the second resource.

Next, the UE receives the PT-RS on the first resource (S2630 and S2730). That is, after generating the PT-RS, the BS (or network) transmits the PT-RS to the UE on the first resource (S2630 and S2820).

In the present disclosure, the position of the subcarrier on which the first resource is located may be determined based on higher layer signaling and the DMRS port index associated with the PT-RS.

For example, when the two DMRS port indices are based on DMRS configuration type 1, the combination of the two DMRS port indices may be one of {#1004, #1000}, {#1005, #1001}, {#1006,#1002}, or {#1007, #1003}. When the two DMRS port indices are based on DMRS configuration type 2, the combination of the two DMRS port indices may be one of {#1006, #1000}, {#1007,#1001}, {#1008,#1002}, {#1009,#1003}, {#1010, #1004}, or {#1011, #1005}.

In the present disclosure, the time density of the PT-RS may be 2 or 4.

In this case, the time density of the PT-RS may be determined based on an MCS scheduled for the UE.

In the present disclosure, the relative index of the symbol on which the first resource is located with respect to the starting symbol of a PDSCH in PDSCH allocation may correspond to a time index set determined by a specific procedure. When the relative index in the allocated PDSCH is 1, the specific procedure may be performed according one of option 1, option 2, or option 3.

<Option 1>
(i) setting i=0 and $l_{ref}$=0;
(ii) based on whether any one symbol in a range from a symbol index max($l_{ref}$+(i-1)*Lpms+1, $l_{ref}$) to a symbol index $l_{ref}$+i*$L_{PTRS}$ overlaps with a symbol used for a DMRS;
(ii-1) setting i=1;
(ii-2) setting $l_{ref}$ to the symbol index of a second DMRS symbol among symbols used for the overlapping DMRS; and
(ii-3) repeating from step (ii) as long as the symbol index $l_{ref}$+i*$L_{PTRS}$ is included in the allocated PDSCH;
(iii) adding a symbol index $l_{ref}$+i*$L_{PTRS}$-X to the time index set for the PT-RS;
(iv) increasing i by one; and
(v) repeating from step (ii) to step (iv) as long as the symbol index $l_{ref}$+i*$L_{PTRS}$ is included in the allocated PDSCH.

<Option 2>
(i) setting i=0 and $l_{ref}$=0;
(ii) based on whether any one symbol in a range from a symbol index max($l_{ref}$+(i-1)$L_{PTRS}$+1, $l_{ref}$)-X to a symbol index $l_{ref}$+i*$L_{PTRS}$-X overlaps with a symbol used for a DMRS;
(ii-1) setting i=1;
(ii-2) setting $l_{ref}$ to the symbol index of a second DMRS symbol among symbols used for the overlapping DMRS; and
(ii-3) repeating from step (ii) as long as the symbol index $l_{ref}$+i*$L_{PTRS}$-X is included in the allocated PDSCH;
(iii) adding the symbol index $l_{ref}$+i*$L_{PTRS}$-X to the time index set for the PT-RS;
(iv) increasing i by one; and
(v) repeating from step (ii) to step (iv) as long as the symbol index $l_{ref}$+i*$L_{PTRS}$-X is included in the allocated PDSCH.

<Option 3>
(i) setting i=0 and $l_{ref}$=0;
(ii) based on whether any one symbol in a range from a symbol index max($l_{ref}$+(i-1)$L_{PTRS}$+1, $l_{ref}$)-X to a symbol index $l_{ref}$+i*$L_{PTRS}$-X overlaps with a symbol used for a DMRS;
(ii-1) setting i=1;
(ii-2) setting $l_{ref}$ to the symbol index of a second DMRS symbol among symbols used for the overlapping DMRS; and
(ii-3) repeating from step (ii) as long as a symbol index $l_{ref}$+i*$L_{PTRS}$ is included in the allocated PDSCH;
(iii) adding the symbol index $l_{ref}$+i*$L_{PTRS}$-X to the time index set for the PT-RS;
(iv) increasing i by one; and
(v) repeating from step (ii) to step (iv) as long as the symbol index $l_{ref}$+i*$L_{PTRS}$ is included in the allocated PDSCH.

In the above options, $L_{PTRS}$ may correspond to the time density of the PT-RS, and X may correspond to an offset for the PT-RS.

The offset X may be determined based on at least one of higher layer signaling, the time density of the PT-RS, or the DMRS port index associated with the PT-RS.

For example, when the offset X is zero or a non-zero integer Y, Y increases as the time density of the PT-RS increases.

Since each of the examples of the proposed methods may be included as one method for implementing the present disclosure, it is apparent that each example may be regarded as a proposed method. Although the proposed methods may be implemented independently, some of the proposed methods may be combined (or merged) for implementation. In addition, it may be regulated that information on whether the proposed methods are applied (or information on rules related to the proposed methods) should be transmitted from a BS to a UE through a predefined signal (e.g., a physical layer signal, a higher layer signal, etc.).

3. Device Configuration

Figure 29:
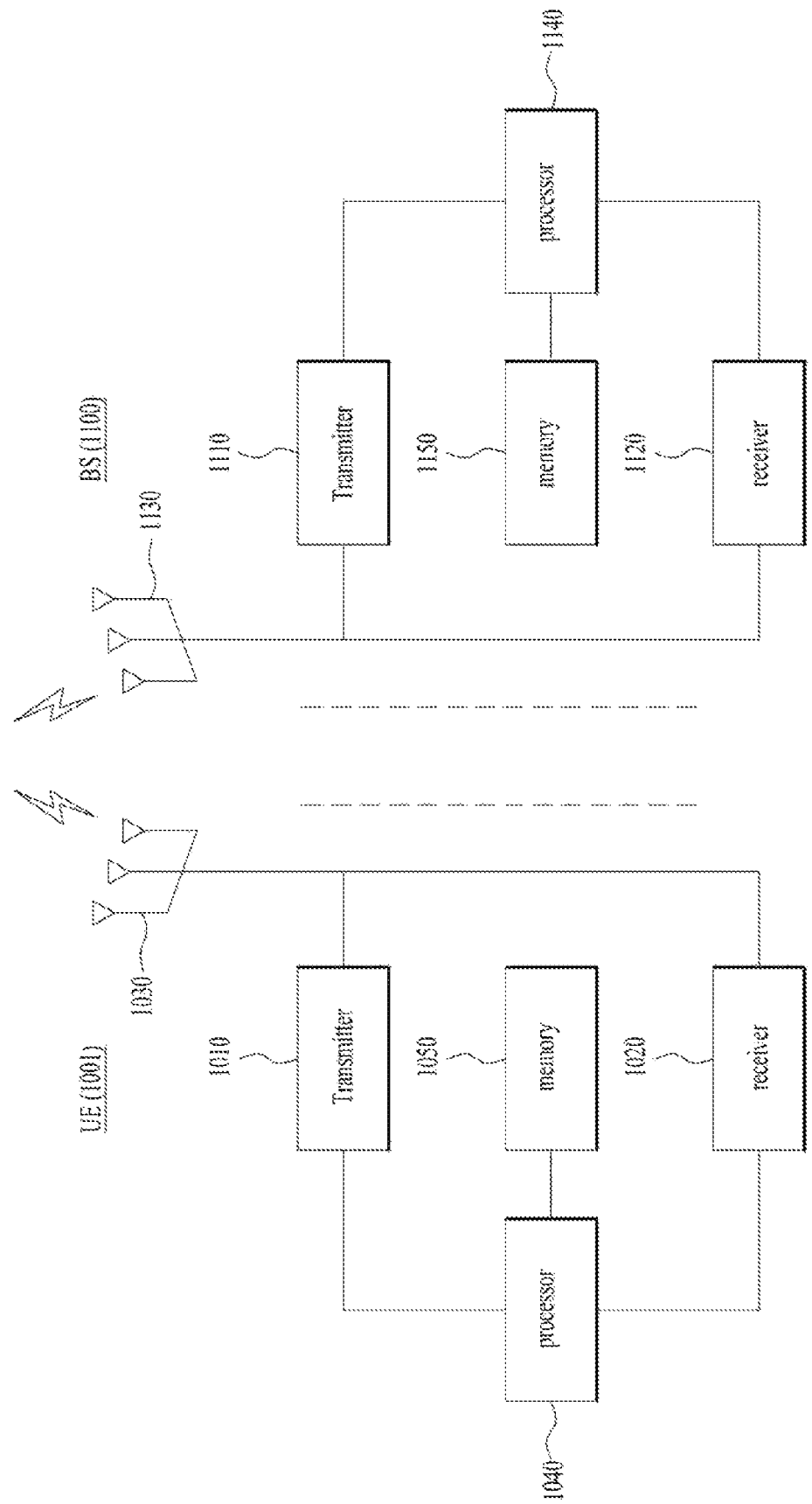
FIG. 29 is a diagram illustrating configurations of a UE and a BS by which proposed embodiments can be implemented.

FIG. 29 is a diagram illustrating configurations of a UE and a BS for implementing the proposed embodiments. The UE and BS illustrated in FIG. 29 may operate to implement the aforementioned embodiments of the PT-RS transmission and reception method therebetween.

The UE 1 may operate as a transmission end on UL and as a reception end on DL. The BS (eNB or gNB) 100 may operate as a reception end on UL and as a transmission end on DL.

That is, the UE and the BS may include transmitters 10 and 110 and receivers 20 and 120, respectively, to control transmission and reception of information, data and/or messages and may include antennas 30 and 130, respectively, to transmit and receive information, data, and/or messages.

The UE and the BS further include processors 40 and 140, respectively, for performing the above-described embodiments of the present disclosure. The processors 40 and 140 control memories 50 and 150, the transmitters 10 and 110, and/or the receivers 20 and 120, respectively, to implement the above-described/proposed procedures and/or methods.

For example, the processors 40 and 140 include communication modems designed to implement radio communication technology (e.g., LTE or NR). The memories 50 and 150 are connected to the processors 140 and 140 and store various information related to operations of the processors 40 and 140. As an example, the memories 50 and 150 may perform a part or all of processes controlled by the processors 40 and 140 or store software code including the above-described/proposed procedures and/or methods. The transmitters 10 and 110 and/or the receivers 20 and 120 are connected to the processors 40 and 140 and transmit and/or receive radio signals. The processors 40 and 140 and the memories 50 and 150 may be a part of a processing chip (e.g., system-on-chip (SoC)).

The transmitters and receivers included in the UE and the BS may perform a packet modulation and demodulation function, a high-speed packet channel coding function, an OFDMA packet scheduling function, and/or a channelization function, for data transmission. The UE and the BS of FIG. 29 may further include low-power radio frequency (RF)/intermediate frequency (IF) units.

Figure 30:
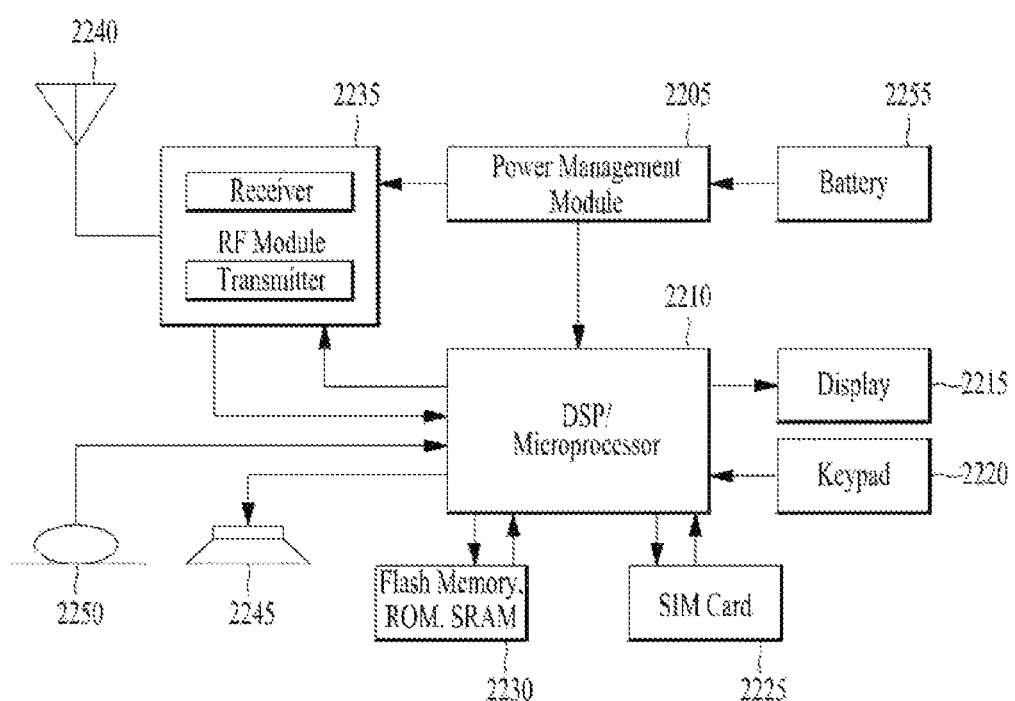
FIG. 30 is a block diagram of a communication device by which proposed embodiments can be implemented.

FIG. 30 is a block diagram of a communication device by which proposed embodiments can be implemented.

The device illustrated in FIG. 30 may be a UE and/or a BS (e.g., an eNB or a gNB) adapted to perform the above mechanism or may be any device for performing the same operation.

As illustrated in FIG. 30, the device may include a digital signal processor (DSP)/microprocessor 210 and an RF module (transceiver) 235. The DSP/microprocessor 210 is electrically connected to the transceiver 235 to control the transceiver 235. The device may further include a power management module 205, a battery 255, a display 215, a keypad 220, a SIM card 225, a memory device 230, a speaker 245, and an input device 250, according to the selection of a designer.

Specifically, FIG. 30 illustrates a UE including the receiver 235 configured to receive a request message from a network and the transmitter 235 configured to transmit transmission or reception timing information to the network. The receiver and the transmitter may constitute the transceiver 235. The UE may further include the processor 210 connected to the transceiver 235 (receiver and transmitter).

In addition, FIG. 30 illustrates a network device including the transmitter 235 configured to transmit a request message to the UE and the receiver 235 configured to receive transmission or reception timing information from the UE. These transmitter and receiver may constitute the transceiver 235. The network further includes the processor 210 connected to the transmitter and the receiver. This processor 210 may be configured to calculate latency based on the transmission or reception timing information.

Thus, the processor included in the UE (or a communication device included in the UE) according to the present disclosure and the processor included in the BS (or a communication device included in the BS) according to the present disclosure may control the corresponding memories and operate as follows.

In the present disclosure, the UE may include at least one radio frequency (RF) module; at least one processor; and at least one memory operably connected to the at least one processor, for storing instructions for causing the at least one processor to perform a specific operation when the at least one processor is executed. In this case, the communication device included in the UE may be configured to include the at least one processor and the at least one memory. The communication device may be configured to include that at least one RF module or may be configured to be connected to at least one RF module without including the at least one RF module.

The at least one processor included in the UE (or the at least one processor of the communication device included in the UE) may be configured to determine a first resource for a PT-RS based on the fact that the PT-RS is associated with a higher DMRS port index of two DMRS port indices which are CDM-T and control the at least one RF module to receive the PT-RS on the first resource. The first resource may be located (i) on the same subcarrier as a second resource for the PT-RS associated with a lower DMRS port index of the two CDM-T DMRS port indices and (ii) on a different symbol from the second resource.

The UE (or the communication device included in the UE) may be configured to communicate with at least one of a mobile terminal, a network, or an autonomous driving vehicle other than a vehicle in which the UE is included.

In the present disclosure, the BS may at least one RF module; at least one processor; and at least one memory operably connected to the at least one processor and configured to store instructions executable by the at least one processor to perform the following operations. In this case, the communication device included in the BS may be configured to include the at least one processor and the at least one memory. The communication device may be configured to include the at least one RF module or be connected to the at least one RF module instead of including the at least one RF module.

The at least one processor included in the BS (or the at least one processor of the communication device included in the BS) may be configured to: generate a PT-RS; map the PT-RS to a first resource based on that the PT-RS is associated with a higher DMRS port index of two DMRS port indices which are CDM-T; and control the at least one RF module to transmit the PT-RS to the UE on the first resource. The first resource may be located (i) on the same subcarrier as a second resource for the PT-RS associated with a lower DMRS port index of the two CDM-T DMRS port indices and (ii) on a different symbol from the second resource.

The UE in the present disclosure may use a personal digital assistant (PDA), a cellular phone, a personal communication service (PCS) phone, a global system for mobile (GSM) phone, a wideband code division multiple access (WCDMA) phone, a mobile broadband system (MBS) phone, a hand-held PC, a laptop PC, a smartphone, or a multi-mode multi-band (MM-MB) terminal.

In this case, the smartphone refers to a terminal taking the advantages of both a mobile communication terminal and a PDA and may be a terminal which incorporates functions of the PDA, i.e., a scheduling function and a data communication function such as fax transmission and reception and Internet connection, into the mobile communication terminal. The MM-MB terminal refers to a terminal which has a multi-modem chip therein and which can operate in any of a mobile Internet system and other mobile communication systems (e.g. a code division multiple access (CDMA) 2000 system, a WCDMA system, etc.).

Embodiments of the present disclosure may be implemented by various means, for example, hardware, firmware, software, or a combination thereof.

In a hardware implementation, methods according to the embodiments of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software implementation, the methods according to the embodiments of the present disclosure may be implemented in the form of a module, a procedure, a function, etc. for performing the above-described functions or operations. For example, software code may be stored in the memory 50 or 150 and executed by the processor 40 or 140. The memory is located at the interior or exterior of the processor and may transmit and receive data to and from the processor via various known means.

The above-described communication device may be a BS, a network node, a transmission terminal, a wireless device, a wireless communication device, a vehicle, a vehicle having a self-driving function, an unmanned aerial vehicle (UAV), an artificial intelligence (AI) module, a robot, an augmented reality (AR) device, a virtual reality (VR) device, or the like.

For example, the UE may include a cellular phone, a smartphone, a laptop computer, a digital broadcast terminal, a PDA, a portable multimedia player (PMP), a navigation device, a slate PC, a tablet PC, an ultrabook, or a wearable device (e.g., a smartwatch, smartglasses, or a head mounted display (HMD)). For example, the UAV may be an unmanned aircraft flying according to a wireless control signal. For example, the HMD is a display device wearable on the head, which may be used to implement VR or AR.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

Additionally, the embodiments of the present disclosure are applicable to various applications such as a self-driving vehicle, a UAV, etc.

What is claimed is:

1. A method of receiving a phase tracking reference signal (PT-RS) by a user equipment (UE) in a wireless communication system, the method comprising:
    receiving, through a higher layer signaling, configuration information for receiving the PT-RS,
    wherein the configuration information includes information on resource element (RE) offset; and
    receiving the PT-RS based on the configuration information,
    wherein the PT-RS is received on a resource determined based on a demodulation reference signal (DM-RS) port associated with the PT-RS and the configuration information, and
    wherein two PT-RSs associated with different two DM-RS ports, which are code division multiplexed, are mapped to a same subcarrier and different symbols, respectively.

2. The method of claim 1,
    wherein based on DMRS configuration type 1, a combination of the different DMRS ports which are code division multiplexed is one of {#1004, #1000}, {#1005, #1001}, {#1006, #1002}, or {#1007, #1003}, and
    wherein based on DMRS configuration type 2, a combination of the different DMRS ports which are code division multiplexed is one of {#1006, #1000}, {#1007, #1001}, {#1008, #1002}, {#1009, #1003}, {#1010, #1004}, or {#1011, #1005}.

3. The method of claim 1, wherein the resource is determined further based on a time density of the PT-RS and the time density of the PT-RS is 2 or 4.

4. The method of claim 3, wherein the time density of the PT-RS is determined based on a modulation and coding scheme (MCS) scheduled for the UE.

5. The method of claim 1,
    wherein a set of time indices for the resource defined relative to a starting symbol of a physical downlink shared channel (PDSCH) in PDSCH allocation is determined based on following procedures,
    wherein the following procedures comprise:
    (i) setting i=0 and $l_{ref}=0$;
    (ii) based on whether any one symbol in a range from a symbol index $\max(l_{ref}+(i-1)*L_{PTRS}+1, l_{ref})$ to a symbol index $l_{ref}+i*L_{PTRS}$ overlaps with a symbol used for a DMRS;
    (ii-1) setting i=1;
    (ii-2) setting $l_{ref}$ to a symbol index of a second DMRS symbol among symbols used for the overlapping DMRS; and
    (ii-3) repeating from step (ii) as long as the symbol index $l_{ref}+i*L_{PTRS}$ is included in the PDSCH allocation;
    (iii) adding a symbol index $l_{ref}+i*L_{PTRS}-X$ to the set of time indices for the PT-RS;
    (iv) increasing i by one; and
    (v) repeating from step (ii) to step (iv) as long as the symbol index $l_{ref}+i*L_{PTRS}$ is included in the allocated PDSCH,
    wherein $L_{PTRS}$ corresponds to a time density of the PT-RS, and wherein X is a value determined based on the information on the RE offset.

6. The method of claim 1,
wherein a set of time indices for the resource defined relative to a starting symbol of a physical downlink shared channel (PDSCH) in PDSCH allocation is determined based on following procedures,
wherein the following procedures comprise:
(i) setting i=0 and $l_{ref}$=0;
(ii) based on whether any one symbol in a range from a symbol index $\max(l_{ref}+(i-1)*L_{PTRS}+1, l_{ref})-X$ to a symbol index $l_{ref}+i*L_{PTRS}-X$ overlaps with a symbol used for a DMRS;
(ii-1) setting i=1;
(ii-2) setting $l_{ref}$ to a symbol index of a second DMRS symbol among symbols used for the overlapping DMRS; and
(ii-3) repeating from step (ii) as long as the symbol index $l_{ref}+i*L_{PTRS}-X$ is included in the PDSCH allocation;
(iii) adding the symbol index $l_{ref}+i*L_{PTRS}-X$ to the set of time indices for the PT-RS;
(iv) increasing i by one; and
(v) repeating from step (ii) to step (iv) as long as the symbol index $l_{ref}+i*L_{PTRS}-X$ is included in the allocated PDSCH,
wherein $L_{PTRS}$ corresponds to a time density of the PT-RS, and
wherein X is a value determined based on the information on the RE offset.

7. The method of claim 1,
wherein a set of time indices for the resource defined relative to a starting symbol of a physical downlink shared channel (PDSCH) in PDSCH allocation is determined based on following procedures,
wherein the following procedures comprise:
(i) setting i=0 and $l_{ref}$=0;
(ii) based on whether any one symbol in a range from a symbol index $\max(l_{ref}+(i-1)*L_{PTRS}+1, l_{ref})-X$ to a symbol index $l_{ref}+i*L_{PTRS}-X$ overlaps with a symbol used for a DMRS;
(ii-1) setting i=1;
(ii-2) setting $l_{ref}$ to a symbol index of a second DMRS symbol among symbols used for the overlapping DMRS; and
(ii-3) repeating from step (ii) as long as the symbol index $l_{ref}+i*L_{PTRS}-X$ is included in the PDSCH allocation;
(iii) adding the symbol index $l_{ref}+i*L_{PTRS}-X$ to the set of time indices for the PT-RS;
(iv) increasing i by one; and
(v) repeating from step (ii) to step (iv) as long as the symbol index $l_{ref}+i*L_{PTRS}$ is included in the allocated PDSCH,
wherein $L_{PTRS}$ corresponds to a time density of the PT-RS, and
wherein X is a value determined based on the information on the time density for the PTRS or the information on the RE offset.

8. The method of claim 7,
wherein based on that the offset X is zero or a non-zero integer Y, Y increases as the time density of the PT-RS increases.

9. A user equipment (UE) for receiving a phase tracking reference signal (PT-RS) in a wireless communication system, the UE comprising:
at least one radio frequency (RF) module;
at least one processor; and
at least one memory operably connected to the at least one processor and configured to store instructions executable by the at least one processor to perform operations comprising:
receiving, through a higher layer signaling, configuration information for receiving the PT-RS,
wherein the configuration information includes information on resource element (RE) offset; and
receiving the PT-RS based on the configuration information,
wherein the PT-RS is received on a resource determined based on a demodulation reference signal (DM-RS) port associated with the PT-RS and the configuration information, and
wherein two PT-RSs associated with different two DM-RS ports, which are code division multiplexed, are mapped to a same subcarrier and different symbols, respectively.

10. The UE of claim 9,
wherein the UE communicates with at least one of a mobile terminal, a network, or an autonomous driving vehicle except a vehicle including the UE.

11. A base station for transmitting a phase tracking reference signal (PT-RS) in a wireless communication system, the base station comprising:
at least one radio frequency (RF) module;
at least one processor; and
at least one memory operably connected to the at least one processor and configured to store instructions executable by the at least one processor to perform operations comprising:
transmitting, to a user equipment (UE), configuration information for receiving the PT-RS,
wherein the configuration information includes information on resource element (RE) offset; and
transmitting, to the UE, the PT-RS based on the configuration information,
wherein the PT-RS is received on a resource determined based on a demodulation reference signal (DM-RS) port associated with the PT-RS and the configuration information, and
wherein two PT-RSs associated with different two DM-RS ports, which are code division multiplexed, are mapped to a same subcarrier and different symbols, respectively.

* * * * *